US012780414B2

(12) United States Patent
Chen et al.

(10) Patent No.: US 12,780,414 B2
(45) Date of Patent: Nov. 3, 2026

(54) DETACHABLE ASSEMBLIES, MODULAR PAYLOADS, AND SYSTEMS FOR UNMANNED AERIAL VEHICLES

(71) Applicant: Ceres Air LLC, Lewes, DE (US)

(72) Inventors: Lei Chen, Lewes, DE (US); Xumin Wu, Lewes, DE (US)

(73) Assignee: CERES AIR INC., Bellevue, WA (US)

( * ) Notice: Subject to any disclaimer, the term of this patent is extended or adjusted under 35 U.S.C. 154(b) by 0 days.

(21) Appl. No.: 19/356,112

(22) Filed: Oct. 11, 2025

(65) Prior Publication Data

US 2026/0035074 A1 Feb. 5, 2026

(51) Int. Cl.

*B64D 1/18* (2006.01)
*B64U 10/14* (2023.01)
*B64U 101/45* (2023.01)

(52) U.S. Cl.

CPC ............... *B64D 1/18* (2013.01); *B64U 10/14* (2023.01); *B64U 2101/45* (2023.01)

(58) Field of Classification Search

CPC ....... B64D 1/18; B64U 10/14; B64U 2101/45
See application file for complete search history.

(56) References Cited

U.S. PATENT DOCUMENTS

2018/0105063 A1* 4/2018 Wei ......................... B60L 50/64
2022/0247347 A1* 8/2022 Gavrilov ................. B08B 13/00

FOREIGN PATENT DOCUMENTS

CN 111846206 B * 10/2024 ............. B64D 27/40

* cited by examiner

*Primary Examiner* — Justin Michael Heston
(74) *Attorney, Agent, or Firm* — Arch & Lake LLP

(57) ABSTRACT

Detachable assemblies, modular payloads, and systems for unmanned aerial vehicles (UAVs) are provided. The detachable assembly includes a fluid storage container configured to store fluid to be sprayed using a UAV. The detachable assembly further includes a battery configured to provide power to the UAV. The fluid storage container and the battery are affixed together to define the detachable assembly. In addition, the detachable assembly includes a latching mechanism affixed to the detachable assembly. The latching mechanism is configured to engage with a corresponding structure of the UAV to secure the detachable assembly to the UAV.

20 Claims, 17 Drawing Sheets

DETACHABLE ASSEMBLIES, MODULAR PAYLOADS, AND SYSTEMS FOR UNMANNED AERIAL VEHICLES

TECHNICAL FIELD

The present disclosure relates to the technical field of unmanned aerial vehicles (UAVs), and more particularly to detachable assemblies, modular payloads, and systems for UAVs.

BACKGROUND

Unmanned aerial vehicles (UAVs) have become increasingly used in agricultural, industrial, and environmental applications. In many cases, UAVs are equipped with spray systems for distributing liquids such as pesticides, fertilizers, or water across wide areas. To operate such systems, the UAV requires both a fluid reservoir for storing the liquid to be dispensed and a battery to supply power for flight and payload operations.

UAV designs often house the battery and fluid reservoir separately, which can complicate replacement and servicing. For example, an operator may be required to detach multiple components individually in order to recharge the battery or refill the reservoir, thereby increasing downtime and reducing operational efficiency.

In addition, many UAV systems rely on ground crews to manually align and secure payload modules. Without proper guiding structures or mobile support systems, coupling a payload to the UAV airframe can be time-consuming and may require skilled handling. In agricultural spraying, for example, UAVs may carry 80-150 liters (over 40 gallons) of liquid, and the entire UAV including both the battery and the fluid reservoir may weigh 60-70 kilograms. Charging a large-capacity battery and refilling a reservoir each take several minutes, while UAVs typically achieve flight times of only 6-10 minutes per mission. Even short delays in turnaround can therefore result in significant inefficiencies. For example, UAV spraying systems could require as long as ten minutes to complete refueling and recharging, severely limiting continuous operation within short application windows.

Accordingly, there is a need for UAV assemblies and systems that allow simultaneous replacement of the battery and fluid reservoir, reduce manual labor, and minimize turnaround time.

SUMMARY

The present disclosure provides detachable assemblies, modular payloads, and systems for unmanned aerial vehicles (UAVs) that address the challenges of rapid turnaround, heavy payload handling, and efficient servicing.

In a first aspect, the present disclosure provides a detachable assembly that includes a fluid storage container, a battery, and a latching mechanism. The fluid storage container configured to store fluid to be sprayed using an UAV. The battery configured to provide power to the UAV, wherein the fluid storage container and the battery are affixed together to define the detachable assembly. The latching mechanism affixed to the detachable assembly and configured to engage with a corresponding structure of the UAV to secure the detachable assembly to the UAV.

In a second aspect, the present disclosure provides a UAV that includes a modular payload and a coupling interface on the modular payload. The modular payload integrates a fluid reservoir and a battery. The coupling interface on the modular payload is configured for releasable engagement with a complementary interface on the UAV.

In a third aspect, the present disclosure provides a system that includes a detachable assembly and a latching mechanism. The detachable assembly includes a fluid reservoir and a battery. The latching mechanism is affixed to the detachable assembly and is configured to engage with a corresponding structure of the system to secure the detachable assembly.

DETAILED DESCRIPTION OF THE EMBODIMENTS

Figure 1:
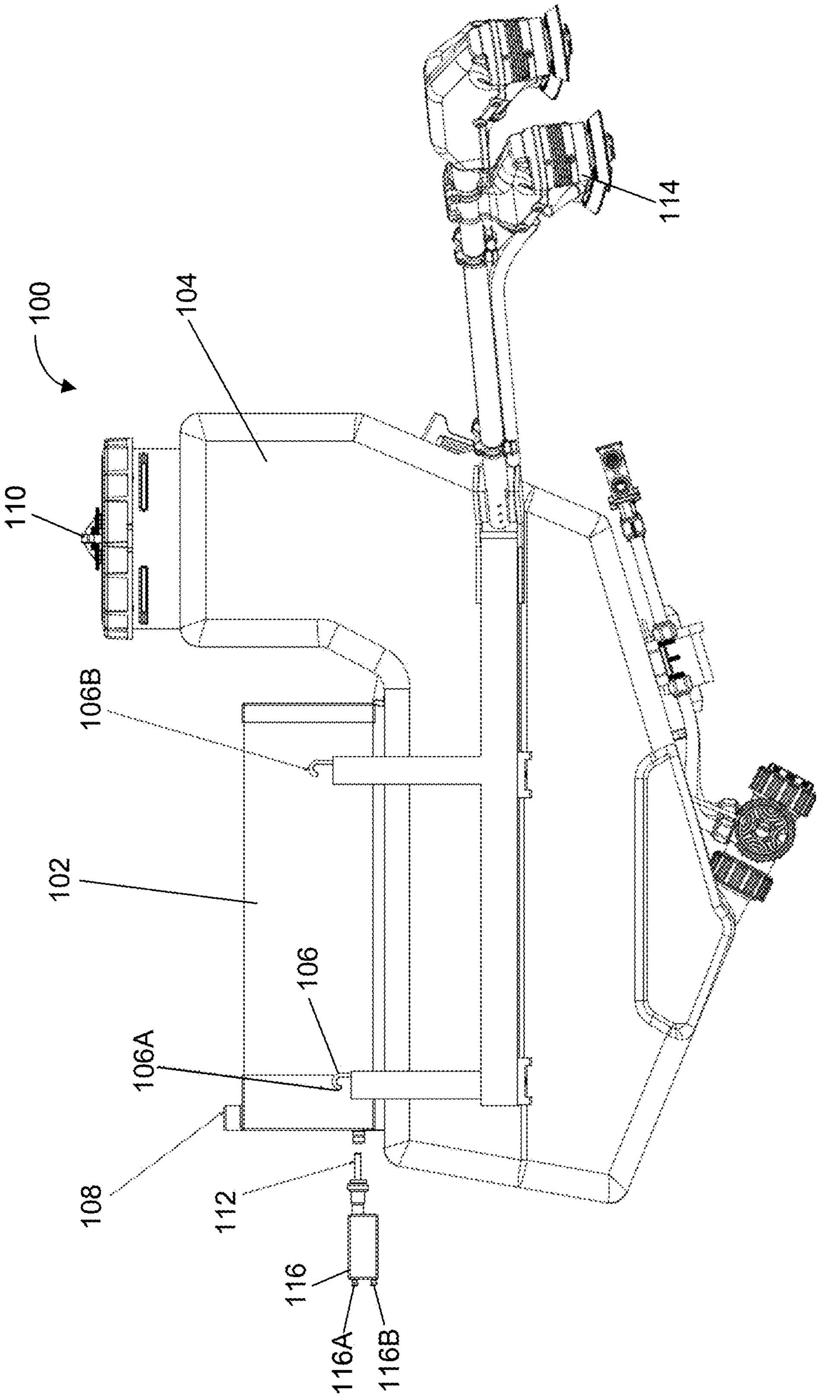
FIG. 1 is a side view of a detachable assembly including a fluid storage container, a battery, and a latching mechanism, according to one or more embodiments of the present disclosure.

The technical solutions in the embodiments of the present disclosure will be described clearly and completely with reference to the accompanying drawings in the embodiments of the present disclosure. Obviously, the described embodiments are only a part of the embodiments of the present disclosure rather than all of them. Based on the embodiments in the present disclosure, all other embodiments obtained by those skilled in the art without creative work shall fall within the scope of protection of the present disclosure.

It should be noted that all directional indications (such as up, down, left, right, front, back) in the embodiments of the present disclosure are merely used to explain relative position relationships or motion conditions between the components in a specific attitude (as shown in the drawings). The directional indication changes as the specific attitude changes.

It should be noted that when an element is described as "being affixed on" or "being arranged on" another element, the element may be directly arranged on the another element or there may be an intermediate element. When an element is described as "being connected to" another element, the element may be directly connected to the another element or there may be an intermediate element.

Moreover, the terms "first", "second", and the like in the present disclosure are merely used for description and cannot be understood as indicating or implying their relative importance or as implicitly indicating the quantity of the technical features indicated. Thus, the feature defined by "first" or "second" may explicitly or implicitly include at least one such feature. In addition, the technical solutions of various embodiments may be combined with each other in any compatible and operable manner.

As described above, despite ongoing improvements in UAV spraying systems, significant technical challenges remain. For example, UAVs require separate replacement of batteries and fluid reservoirs, which are each heavy and cumbersome to handle in the field. A UAV including both the battery and the fluid reservoir batteries may weigh 60-70 kilograms, and a reservoir may store 80-150 liters of liquid. Operators often need to detach, lift, and manually align these components one at a time. This not only exposes operators to risk of strain or injury, but also increases the possibility of misalignment, leaks, or improper electrical connection.

Another major problem is turnaround time. Agricultural UAVs often achieve flight durations of only 6-10 minutes per mission. However, conventional servicing—including refilling fluid, removing and reattaching a heavy reservoir, replacing or recharging a large battery, and ensuring proper coupling—can take 8-10 minutes or more. As a result, the UAV may spend as much or more time on the ground as in the air. Such downtime creates inefficiencies during critical spraying windows, especially when environmental factors such as wind or daylight limit the available time to complete spraying operations.

These inefficiencies translate into real agricultural impact. For example, if a UAV requires ten minutes to service between each ten-minute spraying flight, its effective duty cycle is cut in half. A fleet of UAVs may then require twice the number of aircraft or operators to cover the same acreage, substantially raising costs and complexity. Moreover, in time-sensitive applications such as pesticide spraying or fertilization, delays can reduce crop yield, increase chemical waste, or leave large portions of fields untreated within optimal time windows.

The present disclosure addresses these challenges by integrating the fluid reservoir and battery into a single detachable assembly. By integrating the fluid reservoir and battery into a single detachable assembly, both components can be replaced simultaneously, significantly reducing turnaround time between missions. In certain implementations, turnaround can be shortened from several minutes to less than one minute, thereby increasing the efficiency of UAV operations within short spraying windows. In addition, the detachable assembly reduces manual handling of heavy batteries and large fluid reservoirs. This improves operator safety by lowering the risk of injury during replacement, while also reducing the labor required to service UAVs in the field.

In some embodiments, the detachable assembly may further include alignment guides (e.g. guiding rails) and an automated latching mechanism. The alignment guides constrain the approach path and ensure proper registration with the UAV; upon alignment, the latch automatically engages to provide a positive, secure coupling. For example, the alignment guides may include guiding rails to improve alignment reliability by ensuring proper alignment of the detachable assembly with the UAV, while the automated latching mechanisms provide secure coupling once alignment is achieved. These features reduce operator error, improve attach/detach repeatability, and allow ground crews to service multiple UAVs with less training and faster turnarounds.

Building on these improvements in alignment and coupling, in some embodiments, the present disclosure also provides benefits through the integration of a mobile support structure. The mobile support structure may be configured to position the detachable assembly for proper alignment with the UAV airframe, thereby reducing the need for operators to manually lift and handle heavy batteries and fluid reservoirs. In some embodiments, the mobile support structure includes a lever mechanism that facilitates precise engagement of the detachable assembly at controlled angles and secures the assembly once coupled to the UAV. The mobile support structure may further be configured to release the detachable assembly from an airframe of the UAV and transport it directly to a ground station for charging and refilling. These features streamline UAV servicing, minimize downtime between missions, and enable safe and scalable operation of multiple UAVs in agricultural, industrial, and environmental applications.

In summary, the present disclosure provides a detachable assembly that integrates a fluid storage container and a battery into a single unit, secured to a UAV by a latching mechanism. By allowing the fluid storage container and battery to be replaced together in one operation, the detachable assembly shortens turnaround time, reduces manual handling of heavy components, and improves the overall efficiency and safety of UAV spraying operations.

In some field tests conducted under typical agricultural spraying conditions, integration of the detachable assembly, automated latching, and mobile support structure resulted in a significant reduction in servicing time between UAV flights. For example, the turnaround time for battery replacement and fluid refilling was reduced from approximately five minutes to about one minute, representing an efficiency gain of approximately 80%. In addition, refilling a fluid reservoir with a capacity of around 40 gallons typically requires about 5-8 minutes using conventional methods. By enabling simultaneous replacement of the battery and fluid reservoir and allowing automated connection at the ground station, the system minimizes downtime and allows UAVs to perform multiple flight cycles within narrow operational windows, thereby increasing total acreage coverage per aircraft and improving overall operational efficiency.

FIG. 1 is a side view of a detachable assembly including a fluid storage container, a battery, and a latching mechanism, according to one or more embodiment of the present disclosure. The detachable assembly 100 includes a battery 102 and a fluid storage container 104, which are affixed together to define a single unit. As used herein, the terms "detachable assembly" and "modular payload" may be used interchangeably to refer to a unit that integrates a battery and a fluid storage container, and is configured for releasable attachment to an unmanned aerial vehicle (UAV). In various non-limiting embodiments, the container 104 and battery 102 may be integrated in several ways. The container 104 may define an integral pocket that receives the battery 102. The battery may be fixed in the pocket with a bracket and potting. A thermal barrier may be placed between the battery and the wall of the container to limit heat transfer to fluid. The container 104 may provide a slide-in bay with guide rails that accept a cartridge form of the battery 102. The cartridge latches in place and engages sealed blind-mate contacts on full insertion. The battery 102 may be housed in a base coupled to the container 104. The base may use a bayonet-style coupling and an environmental seal. A compressible thermal interface may conduct heat away from the battery. The container 104 may include a double-wall region that forms an internal cavity. The battery 102 may be disposed in the cavity with insulation and a pressure-relief vent. The battery 102 may be configured as an annular or segmented pack that surrounds a portion of the container 104. A clamshell housing with a peripheral gasket may capture the pack, and alignment features such as detents or magnets may ensure repeatable positioning. A backplate may be hinged to the container 104 and carry the battery 102 on its inner face. Closing the backplate compresses a seal and automatically mates a blind-mate connector. A tool-less latch may allow field replacement. The battery 102 may be over-molded in an elastomeric encapsulant and bonded to an exterior boss of the container 104. A heat spreader may be positioned between the battery 102 and the container 104. In one mode, the heat spreader thermally couples the battery to the fluid for controlled warming. In another mode, the heat spreader thermally isolates the battery using low-conductivity standoffs or aerogel to maintain fluid temperature within a target range.

The battery 102 is configured to provide power to a UAV. In some embodiments, the battery 102 may supply electrical power to an airframe including one or more lift structures, flight control systems, navigation electronics, and spray assembly configured to dispense the fluid stored in the fluid storage container 104. The battery 102 may include a high-capacity rechargeable battery pack, such as a lithium-ion or lithium-polymer battery, capable of supporting the heavy power demands of agricultural spraying operations. The battery 102 may be designed for rapid charging, and in certain implementations, may interface with a cooling system to prevent overheating during high-rate charging cycles. In some examples, the cooling system may include a liquid cooling loop that circulates water or a glycol-based solution through conduits embedded in or adjacent to the battery pack. In some examples, the cooling system may include an air-cooling system that forces ambient or conditioned air across finned heat sinks thermally coupled to the battery cells. In some examples, the cooling system may include a phase-change cooling structure, such as a heat pipe or vapor chamber, configured to transfer heat away from the battery toward a larger thermal mass. In some embodiments, the cooling system may further incorporate temperature sensors and automatic flow control valves to dynamically regulate coolant flow and maintain the battery temperature within a target operating range.

The fluid storage container 104 is configured to store fluid, such as pesticides, fertilizers, or other liquids, to be sprayed during UAV operation. In some embodiments, the fluid storage container 104 may have a capacity of 80 to 150 liters (approximately 40 gallons or more) to accommodate large-scale agricultural spraying missions. The container 104 may be formed of lightweight yet durable materials, such as reinforced polymers or composite structures, to minimize overall weight while maintaining structural integrity under vibration and dynamic flight conditions. The fluid storage container 104 may further include internal baffling or partition structures to reduce sloshing during UAV maneuvers, thereby improving flight stability. As used herein, the terms “fluid reservoir” and “fluid storage container” are used interchangeably to describe the fluid-holding component of the detachable assembly 100.

The detachable assembly 100 may further include a latching mechanism 106 comprising latch members 106A and 106B, which are affixed to the detachable assembly 100 and configured to engage with a corresponding structure of a UAV. As illustrated in FIG. 1, the latching mechanism 106 includes two latch members; however, in other embodiments, the latching mechanism may include fewer or more latch members, depending on the size of the detachable assembly and the structural requirements of the UAV. The latching mechanism 106 secures the detachable assembly 100 to an airframe of a UAV during flight and allows the detachable assembly 100 to be removed for servicing or replacement.

In agricultural and industrial operations, UAVs may have to perform dozens of spraying or inspection flights in a single workday. Each mission consumes both electrical energy and fluid, requiring that the battery and reservoir be regularly replaced. Conventional UAVs typically require an operator to disconnect multiple fasteners, manually align heavy components, and then reattach them in the correct position. This process can take several minutes per turnaround, during which time the UAV remains grounded and unproductive. Moreover, repetitive manual handling of heavy batteries and large reservoirs increase the risk of operator fatigue or injury, particularly when performed outdoors under time pressure. The latching mechanism 106 addresses these issues by enabling rapid and reliable attachment and detachment of the detachable assembly 100. In some embodiments, the latching mechanism may allow the entire assembly to be replaced in less than one minute, compared with 8-10 minutes for conventional systems. By minimizing ground time, the UAV can spend a greater proportion of its duty cycle in active flight, thereby improving acreage coverage during limited spraying windows. In addition, simplified replacement reduces the need for highly trained personnel, allowing ground crews to service multiple UAVs efficiently and safely.

In some embodiments, the latching mechanism 106 may include spring-loaded or cam-actuated latch members that automatically lock upon engagement, thereby simplifying installation and ensuring consistent coupling. In other embodiments, the latch members 106A and 106B may be manually actuated by an operator to selectively release the detachable assembly 100 from a UAV. The latching mechanism 106 may further include alignment features that cooperate with a complementary structure on an airframe of a UAV to ensure proper positioning of the detachable assembly 100 before secure engagement. The latching mechanism 106 may further include guide pins and complementary sockets configured to provide initial alignment of the detachable assembly 100 relative to the UAV airframe. In some embodiments, the latching mechanism 106 includes rotary cam locks driven by a lever or actuator, the rotary cam locks being configured to rotate into engagement with corresponding recesses on the UAV to secure the detachable assembly 100. In other embodiments, the latching mechanism 106 includes spring-biased hooks or claws that automatically snap into place when the detachable assembly 100 reaches a coupling position, and that may be released by actuation of a push-button or lever. In certain embodiments, the latching mechanism 106 includes quick-release levers configured to simultaneously disengage multiple latch members to enable rapid removal of the detachable assembly 100. The latching mechanism 106 may further include safety interlocks, such as mechanical or electrical sensors, configured to confirm full engagement of the latch members before takeoff. In some implementations, the latch members may be asymmetrically positioned so that the detachable assembly 100 can only be installed in a correct orientation relative to the UAV. As used herein, the terms “latching mechanism” and "coupling interface" may be used interchangeably to describe structures that releasably secure the detachable assembly 100 to the UAV.

In some embodiments, the latching mechanism described herein may be implemented using specific structural features that provide the engagement function. For example, the latching mechanism may include one or more cam-actuated latch members mounted on pivot pins within a housing fixed to the detachable assembly. When the detachable assembly is advanced into the coupling position, the cam surfaces of the latch members ride against complementary recesses or ramped surfaces on the UAV airframe, causing the latch members to rotate into an engaged position. In other embodiments, the latching mechanism may include spring-biased hooks or claws arranged to snap into mating recesses or sockets on the UAV airframe, thereby providing a positive mechanical lock without requiring manual fastening. The latch members may be retained within a reinforced frame or bracket that distributes load during flight and resists vibration loosening.

The guiding structures may likewise be defined by rigid linear rails, tapered slots, or conical alignment pins formed on the detachable assembly or the UAV airframe. These structural elements constrain the relative movement of the detachable assembly along a predetermined axis during installation, thereby ensuring repeatable alignment between the coupling interface and the complementary interface. In some examples, asymmetric guide pin arrangements may be used to prevent incorrect orientation of the assembly.

The charging and fluid refilling features may also be structurally realized. For example, the charging port may include blind-mate electrical connectors with spring-loaded contacts and environmental sealing gaskets to maintain electrical integrity under field conditions. The fluid filling port may include quick-connect couplings with integrated check valves and O-ring seals to provide leak-free fluid transfer when mated with a ground station. Similarly, the spray assembly may include nozzles mounted on rigid manifolds with dedicated attachment brackets to ensure positional stability relative to the airframe.

By integrating the battery 102 with the fluid storage container 104 in a single detachable assembly 100, both components can be simultaneously replaced, thereby reducing downtime and improving operational efficiency of the UAV. By incorporating the latching mechanism 106 into the detachable assembly 100, the latching mechanism 106 provides reliable attachment during flight while enabling rapid removal and replacement of the detachable assembly 100 in field operations.

A charging port 108 is electrically coupled to the battery 102. The charging port 108 is configured for engagement with a corresponding connector of a ground station to recharge the battery 108. In some embodiments, the charging port 108 may incorporate safety features such as insulated contacts, current-limiting circuitry, or automatic shut-off to prevent overcharging or electrical faults. The charging port 108 may also be arranged to align automatically with complementary connectors on a mobile support station or trailer, allowing automated charging of the battery 102 when the detachable assembly 100 is docked. By integrating a charging port 108 directly into the detachable assembly 100, both power replenishment and fluid refilling can occur in parallel at the ground station, thereby improving the efficiency and scalability of UAV servicing operations.

In some embodiments, the battery 102 may further include a cooling interface 112 configured to circulate a cooling fluid through one or more conduit(s) 116 during charging. The cooling interface 112 may be connected to an external cooling system at a ground station, which supplies the cooling fluid under controlled flow and temperature conditions. As illustrated in FIG. 1, the interface includes two conduits 116A and 116B that form a liquid inlet and outlet path. The conduit 116A may be configured to receive cooling fluid from an external supply, while the conduit 116B may be configured to discharge the heated fluid after passing through the battery 102, thereby preventing overheating of the battery 102 during high-rate charging. In other embodiments, the cooling interface 112 may include a single conduit configured to alternately receive and release cooling fluid, thereby simplifying the connection structure while still enabling thermal regulation of the battery. In some embodiments, the cooling fluid may be water, a glycol-based solution, or another thermally conductive medium suitable for rapid heat removal.

The cooling interface 112 may further incorporate a quick-connect coupling that allows the conduits 116A and 116B to be rapidly engaged with or disengaged from a corresponding connector at a ground station or mobile support station without the use of tools. Seals or O-rings may be provided within the connector to prevent leakage during connection and disconnection. In some embodiments, the coupling may also include automatic shutoff valves that close when a conduit is disengaged, thereby preventing accidental spillage of coolant. By integrating the quick-connect cooling interface 112 with the detachable assembly 100, the system enables safe and efficient thermal management of the battery 102 during high-rate charging operations, while also reducing turnaround time when servicing the detachable assembly 102 in the field.

A filling port 110 is fluidly coupled to the fluid storage container 104, and is configured for engagement with a corresponding connector of the ground station to allow the fluid storage container 104 to be refilled. In some embodiments, the filling port 110 may include a one-way valve or quick-connect fitting to prevent leakage and ensure reliable coupling with the ground station. The filling port 110 may also be integrated with flow sensors or level sensors that enable monitoring of refill operations and confirmation that the proper amount of fluid has been loaded. In some embodiments, the filling port 110 may be positioned to allow both manual refilling by an operator and automated refilling when the detachable assembly 100 is docked into a mobile support station. By enabling fast and reliable replenishment of the fluid storage container 104, the filling port 110 further reduces turnaround time between missions and improves the efficiency of UAV spraying operations.

In some embodiments, the detachable assembly 100 also includes a spray assembly 114 coupled to the fluid storage container 104. The spray assembly 114 is configured to dispense the stored fluid in response to a control signal received from a UAV, enabling precise delivery of liquid during aerial spraying operations. In some embodiments, the spray assembly 114 may include one or more nozzles that atomize the fluid into fine droplets to achieve uniform coverage over a target area. The nozzles may be configured for adjustable flow rates, droplet sizes, or spray patterns depending on the application requirements. The spray assembly 114 may further include electrically actuated valves or pumps that control the timing and rate of fluid discharge under command of the UAV's flight control system. In some embodiments, the spray assembly 114 may be integrated with sensors, such as flow meters or pressure sensors, to monitor dispensing performance and ensure consistent delivery. By incorporating the spray assembly 114 into the detachable assembly 100, the system allows simultaneous exchange of both the fluid storage container 104 and its dispensing mechanism, thereby reducing maintenance complexity and ensuring operational readiness of the UAV.

As described above, the detachable assembly 100 integrates the battery 102, the fluid storage container 104, the latching mechanism 106 into a single modular payload. By integrating these components, the detachable assembly 100 enables simultaneous replacement, recharging, and refilling, thereby minimizing downtime between UAV missions. The integration of both power supply and fluid delivery functions within a single detachable assembly also simplifies the structural design of the UAV, reduces the need for separate servicing operations, and enhances the safety and efficiency of field handling. While FIG. 1 illustrates one embodiment of the detachable assembly 100, it should be understood that variations in the arrangement, number, or type of components may be implemented without departing from the scope of the present disclosure.

Figure 2:
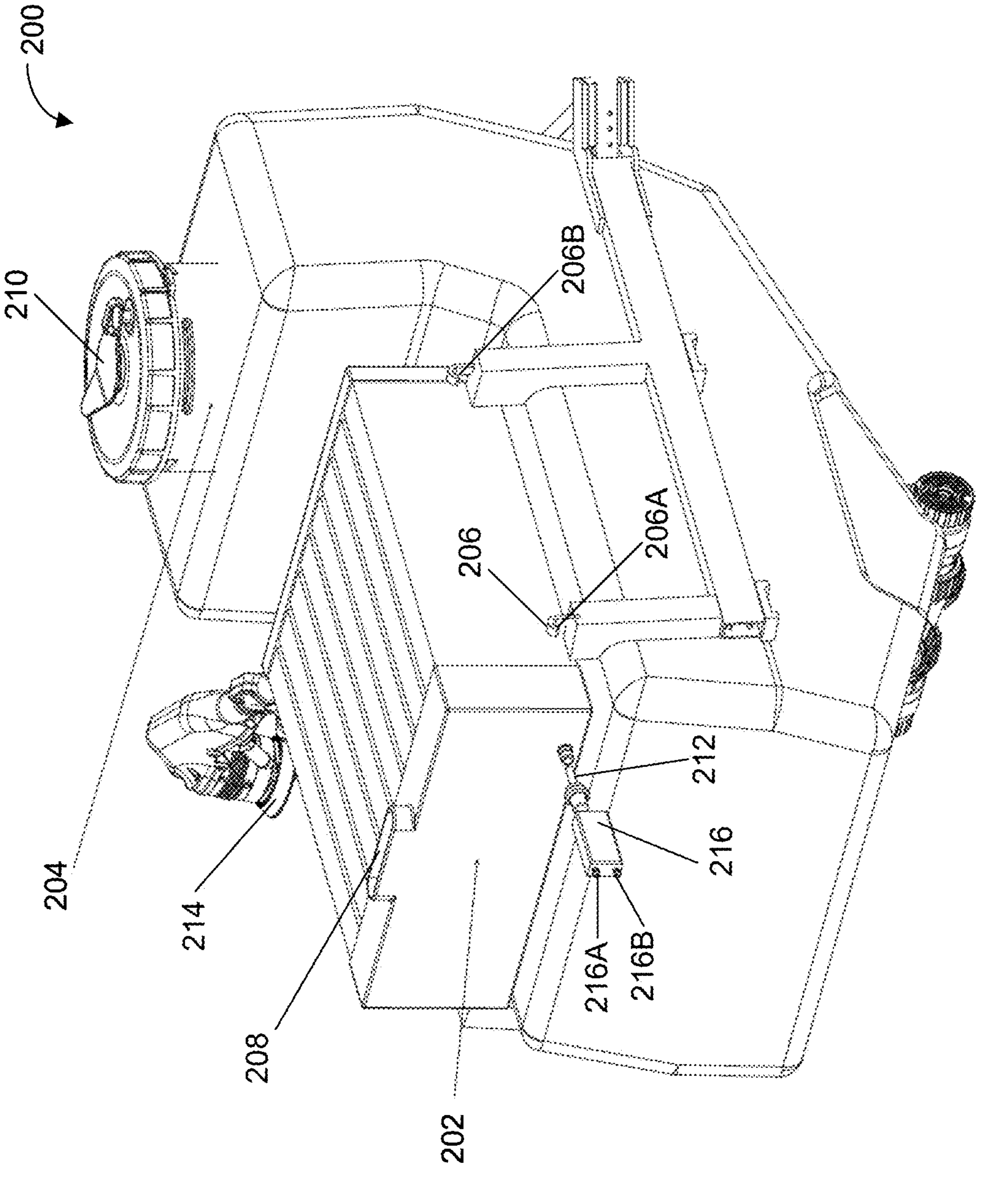
FIG. 2 is a perspective view of a modular payload including a fluid reservoir, a battery, and a coupling interface, according to one or more embodiments of the present disclosure.

FIG. 2 is a perspective view of a modular payload 200 including a battery 202, a fluid reservoir 204, and a coupling interface 206 on the modular payload 200 configured for releasable engagement with a complementary interface on a UAV, according to one or more embodiment of the present disclosure. The perspective view of FIG. 2 illustrates the relative spatial arrangement of the battery 202 and the fluid reservoir 204, as well as the orientation of service ports and interfaces accessible from the exterior of the modular payload 200. This perspective highlights how the components of the modular payload 200 are integrated into a compact and field-serviceable unit. As used herein, the terms "modular payload" and "detachable assembly" may be used interchangeably to refer to a component that integrates a battery and a fluid reservoir, and is configured for releasable attachment to an unmanned aerial vehicle (UAV).

The modular payload 200 includes a charging port 208 disposed on an accessible exterior surface of the battery 202. In some embodiments, the orientation of the charging port 208 may be selected to support automated connection when the modular payload 200 is placed into a mobile support station. The modular payload 200 further includes filling port 210 fluidly coupled to the fluid reservoir 204. The filling port 210 is positioned to allow direct access for manual refilling by an operator, or automated refilling when the modular payload 200 is placed into a mobile support station. Both of the charging port 208 and the filling port 210 are configured to engage corresponding connectors of a ground station.

As illustrated in FIG. 2, the coupling interface 206 further includes latch members 206A and 206B, which are positioned along the sides of the battery 202. The perspective view illustrates the latch members are configured to extend upwardly to engage with a complementary interface on an airframe of an UAV. In some embodiments, the latch members may be arranged asymmetrically to prevent misalignment of the modular payload 200 during installation. For example, latch member 206A may be positioned at a relatively lower location, while latch member 206B may be positioned at a relatively higher location, thereby ensuring that the modular payload 200 can only be coupled in the correct orientation with the UAV airframe.

In some embodiments, the modular payload 200 is configured to be guided along a rail structure into a coupling position, the coupling interface 206 being configured to engage with and secure the modular payload 200 with a complementary interface on an airframe of an UAV upon reaching the coupling position.

In some embodiments, the latch members 206A and 206B configured to automatically lock the modular payload 200 to an UAV upon engagement and to release the modular payload 200 in response to manual actuation of the latch members 206A and 206B.

In some embodiments, the battery 202 may also include a cooling interface 212 configured to circulate a cooling fluid via conduit 216 during charging. As illustrated in FIG. 2, the cooling interface 212 may include dual conduits 216A and 216B that form a dual-channel liquid injection and discharge path. The perspective view highlights the arrangement of the conduits relative to the charging port 208, allowing both power replenishment and thermal management to be performed in parallel. In other embodiments, the cooling interface 212 may be implemented as a single conduit configured to alternately receive and discharge coolant, thereby simplifying the interface structure.

In some embodiments, the perspective view of FIG. 2 also illustrates a spray assembly 214 configured to dispense the fluid stored in the fluid reservoir 204 in response to a control signal. The spray assembly 214 may include one or more nozzles or outlet fittings, and its positioning in FIG. 2 demonstrates how fluid can be directed downward or laterally relative to the UAV during operation. By integrating the spray assembly 214 with the fluid reservoir 204, the modular payload 200 allows both storage and dispensing components to be exchanged as a single unit.

Figure 3:
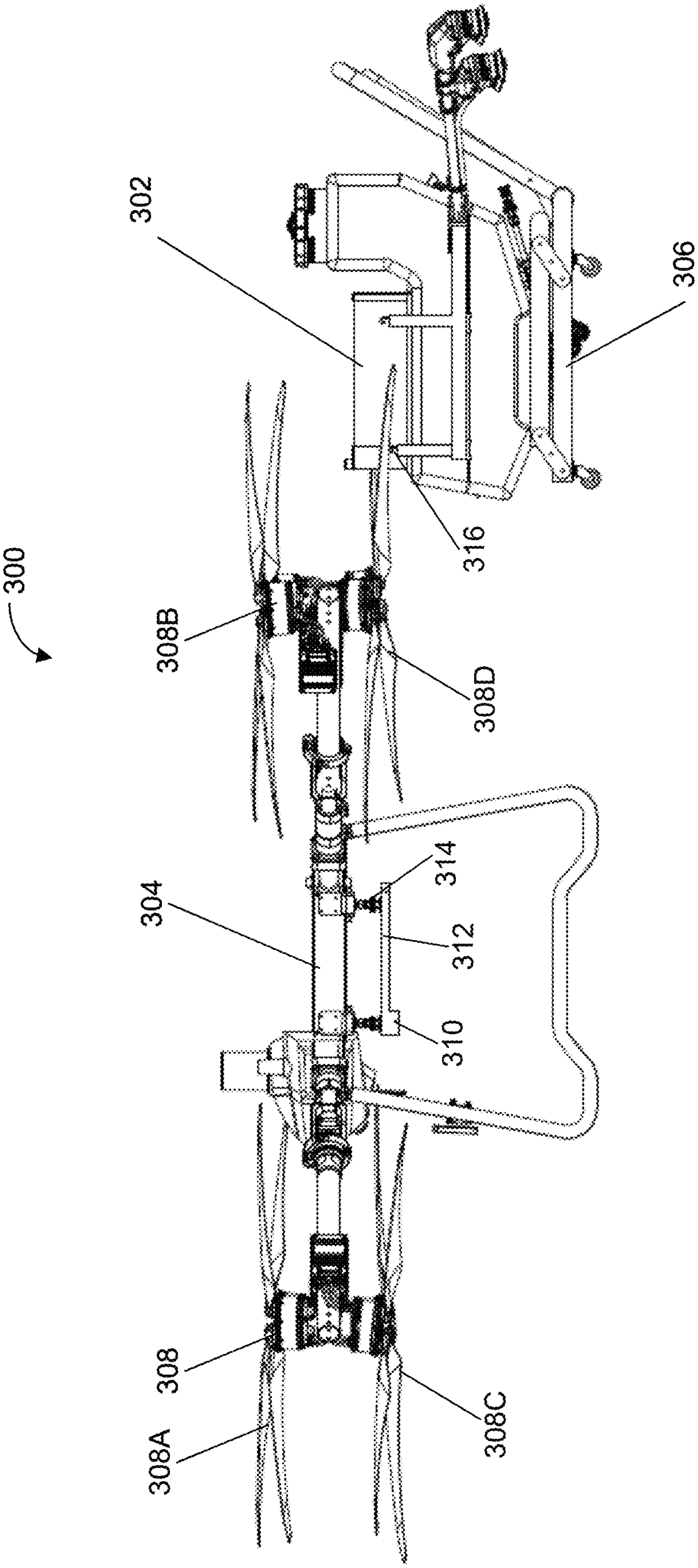
FIG. 3 is a side view of a system including a detachable assembly, according to one or more embodiments of the present disclosure.

FIG. 3 is a side view of a system 300 including a detachable assembly 302, according to one or more embodiments of the present disclosure. The detachable assembly 302, also referred to herein as a modular payload, integrates a battery and a fluid reservoir into a single unit. In some embodiments, the system 300 further includes an airframe 304 of a UAV and a mobile support structure 306. A coupling interface 316 provided on the detachable assembly 302 is configured for releasable engagement with a complementary interface 310 located on the airframe 304. As used herein, the terms coupling interface and latching mechanism may be used interchangeably to describe structures that releasably secure a detachable assembly or modular payload to the UAV, and the terms complementary interface and corresponding structure may likewise be used interchangeably to describe the structures on the UAV that receive the coupling interface.

The airframe 304 includes one or more lift structures 308, shown in FIG. 3 as lift rotors 308A, 308B, 308C, and 308D. These lift structures generate thrust and provide flight stability for the UAV during operation. In the illustrated embodiment, the UAV is shown with four lift rotors arranged symmetrically about the airframe 304 to provide balanced lift and maneuverability. In other embodiments, however, the airframe 304 may include fewer or more lift elements, such as a tricopter configuration with three rotors or a hexacopter or octocopter configuration with six or eight rotors, depending on load requirements and mission profiles.

The airframe 304 may include a complementary interface 310 that serves as the structural engagement point for the coupling interface 316 of the detachable assembly 302. When the detachable assembly 302 is guided into place, the coupling interface 316 aligns with and engages the complementary interface 310, thereby securing the detachable assembly 302 to the airframe 304 for flight. As used herein, the terms complementary interface and corresponding structure may be used interchangeably to describe the structural features of the airframe that receive and secure the coupling interface of the detachable assembly 302.

In some embodiments, the airframe 304 may further include a rail structure 312 configured to guide the detachable assembly 302 into a coupling position. The rail structure 312 provides a controlled alignment pathway that ensures the detachable assembly 302 is properly oriented relative to the airframe 304 during installation. As the detachable assembly 302 is advanced or lifted into place, the rail structure 312 directs the coupling interface 316 of the detachable assembly 302 into engagement with the complementary interface 310 of the airframe. Once the assembly reaches the coupling position, the interfaces engage and lock together to secure the detachable assembly 302 in place for flight operations. In some embodiments, the rail structure 312 may include slotted guide features that automatically correct minor misalignments during docking. This reduces the need for manual adjustment by the operator and ensures repeatable, secure connections even under field conditions. In other embodiments, multiple rails may be used in parallel to provide additional stability and load-bearing capacity for larger loads. As used herein, the term rail structure encompasses any guiding mechanism that facilitates alignment of the detachable assembly with the UAV airframe, including linear rails, slot guides, or angled support members. By integrating such a rail structure 312, the UAV achieves faster turnaround between missions while minimizing the potential for operator error during replacement of the detachable assembly 302.

In some embodiments, the airframe 304 may further include one or more sensors 314, such as a radar sensor, a flow sensor, and a weight sensor. In some embodiments, the radar sensor may provide altitude or terrain-following data to ensure consistent spraying height above crops or ground surfaces. The flow sensor may be coupled to the spray assembly to monitor the dispensing rate of fluid, thereby enabling closed-loop control of spray volume and ensuring uniform coverage. The weight sensor may be positioned to measure the weight of the detachable assembly 302 and determine the amount of fluid remaining in fluid reservoir of the detachable assembly 302 in real time. These sensors may be used individually or in combination to support precision agriculture or other fluid-dispensing operations. For example, the UAV may dynamically adjust flight speed, altitude, or spray rate based on sensor feedback, ensuring efficient use of chemicals and reducing waste. The integration of these sensors also allows for predictive control, such as automatically signaling when the fluid reservoir is nearly empty or when the UAV needs to return for refilling. In some embodiments, additional sensors may be included, such as pressure sensors to detect nozzle clogging, temperature sensors to monitor battery or fluid conditions, or GPS and inertial measurement units (IMUs) for enhanced navigation and stability. By incorporating multiple types of sensors into the airframe 304, the UAV can achieve real-time monitoring of payload status, adaptive flight control, and improved operational safety across agricultural, industrial, and environmental applications.

The mobile support structure 306 is configured to transport the detachable assembly 302 between the airframe 304 of the UAV and a ground station. In some embodiments, the mobile support structure 306 may include a lever mechanism that is configured to raise the detachable assembly 302 at a controlled angle, thereby facilitating smooth engagement of the coupling interface 316 of the detachable assembly 302 with the complementary interface 310 of the airframe 304 of the UAV. This controlled lifting reduces the need for manual handling and ensures proper alignment with the rail structure 312 during installation. Once the UAV has completed a mission, the mobile support structure 306 may also be used to disengage the detachable assembly 302 from the airframe and lower it safely for transport. The mobile support structure 306 can then carry the detached assembly directly to a ground station, where the battery may be recharged and the fluid reservoir refilled in preparation for reuse. In some implementations, the support structure may include wheels or tracks for mobility. By incorporating these features, the mobile support structure 306 minimizes the physical labor associated with handling heavy payloads, improves operator safety, and significantly reduces turnaround time between UAV missions.

Figure 4:
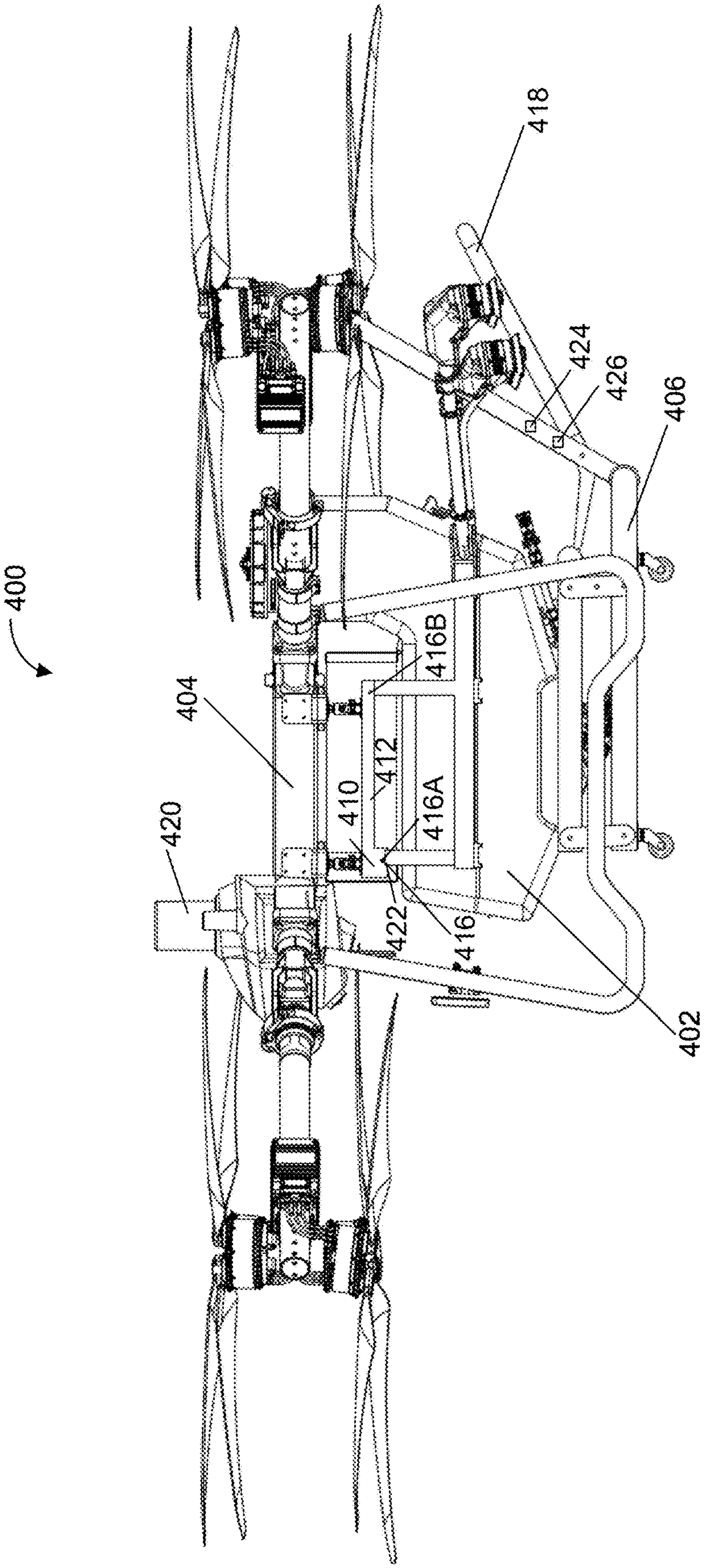
FIG. 4 is a is a side view of a system including a detachable assembly, where the detachable assembly is guided into position and secured to an airframe of a UAV.

FIG. 4 is a side view of a system 400 including a detachable assembly 402, according to one or more embodiments of the present disclosure. In some embodiments, the system 400 further includes an airframe 404 of a UAV, and a mobile support structure 406. The detachable assembly 402 and the airframe 404 together form an unmanned aerial vehicle (UAV) 420. The detachable assembly 402, also referred to herein as a modular payload, integrates a battery and a fluid reservoir into a single unit configured for releasable attachment to the UAV 420. As used herein, the terms coupling interface and latching mechanism may be used interchangeably to describe structures that releasably secure a detachable assembly or modular payload to the UAV 420, and the terms complementary interface and corresponding structure may likewise be used interchangeably to describe the structures on the UAV that receive the coupling interface.

To install the detachable assembly 402, the mobile support structure 406 is first used to transport and position the detachable assembly 402 beneath the airframe 404. In some embodiments, the mobile support structure 406 includes a lever mechanism 418 that lifts the detachable assembly 402 at a controlled angle, thereby reducing manual handling of heavy components and preparing the assembly for alignment with the UAV 420. In some embodiments, the lever mechanism 418 may include a scissor-lift style linkage actuated by a manual handle or powered actuator, enabling the detachable assembly 402 to be raised vertically with minimal operator effort. In other embodiments, the lever mechanism 418 may include a hydraulic or pneumatic cylinder configured to apply a smooth lifting force at a controlled angle, thereby accommodating heavier detachable assemblies while maintaining precise alignment with the airframe 404. In certain implementations, the lever mechanism 418 may include a cam-follower system that converts rotary motion of a handle into linear upward displacement of the detachable assembly 402. In yet other embodiments, the lever mechanism 418 may include a counterbalanced pivot arm equipped with springs or weights that offset the load of the detachable assembly 402, allowing an operator to raise or lower the assembly with reduced manual force. The lever mechanism 418 may further be configured with locking detents or ratchet positions to hold the detachable assembly 402 securely at intermediate heights during installation or removal.

As the detachable assembly 402 is lifted into place, a rail structure 412 on the airframe 404 guides the assembly along a controlled path toward its final coupling position. The rail structure 412 ensures proper alignment of the detachable assembly 402, minimizing operator error and enabling repeatable, reliable engagement under field conditions. In some embodiments, the rail structure 412 may include tapered or slotted features that correct minor misalignments automatically as the assembly advances.

Once the detachable assembly 402 reaches the coupling position, the coupling interface 416 on the detachable assembly 402 the engages with a complementary interface 410 on the airframe 404. The coupling interface 416 includes latch members 416A and 416B, which extend upwardly to secure the detachable assembly 402 to the airframe 404. In the illustrated embodiment, the latch members may be arranged asymmetrically, such as latch member 416A positioned lower and latch member 416B positioned higher, to ensure the detachable assembly 402 can only be coupled in the correct orientation with the UAV. The latch members may automatically lock upon engagement, securing the assembly during flight, and may also be manually actuated to release the payload when servicing is required.

In some embodiments, the automatic alignment and locking features described herein may be implemented using a combination of mechanical actuators and control systems. For example, the latching mechanism may include servo-driven or solenoid-driven latch members that receive an electronic control signal from the UAV or a ground station to actuate between locked and released states. In other embodiments, spring-biased latches may be configured to lock automatically upon physical engagement, while sensors on the UAV (e.g., proximity sensors, Hall effect sensors, or magnetic guidance sensors) detect the presence and alignment of the detachable assembly and generate signals to confirm engagement. Similarly, automatic alignment may be achieved through magnetically keyed guiding rails, conical guide pins, or linear actuators that draw the detachable assembly into its final coupling position once preliminary alignment is detected. Automated refilling may be supported by motorized valves or pump assemblies at the ground station that are triggered when the detachable assembly is docked, allowing both electrical and fluidic connections to be established without manual intervention. These features collectively allow the UAV system to achieve rapid, reliable attachment and servicing of detachable assemblies with minimal operator input.

After mission completion, the mobile support structure 406 may once again be used to disengage the detachable assembly 402 from the airframe 404 and transport it to a ground station. At the ground station, battery can be recharged and fluid reservoir can be refilled, preparing the detachable assembly 402 for reuse. By combining guided alignment, automatic latching, and mobile handling, the system improves operator safety, reduces turnaround time, and enables scalable UAV operations in agricultural, industrial, and environmental applications.

In some embodiments, the mobile support structure may further incorporate power-assisted actuation mechanisms to raise or lower the detachable assembly. For example, the mobile support structure may include one or more hydraulic cylinders, pneumatic cylinders, or electric linear actuators coupled to a lever mechanism or lifting platform. These actuators may be controlled by a manual switch, foot pedal, or onboard control electronics to provide smooth and controlled vertical displacement of the detachable assembly during installation or removal. Power-assisted actuation enables ground crews to handle heavier detachable assemblies with reduced physical effort and improved alignment accuracy, particularly in agricultural environments where repeated payload changes are required.

In some embodiments, the mobile support structure may also include integrated charging and fluid refilling docking interfaces. For example, the support structure may define electrical connectors and fluid couplings positioned to automatically mate with corresponding charging ports and filling ports of the detachable assembly when the assembly is placed on the structure. The docking interfaces may include blind-mate electrical contacts, spring-loaded connectors, and quick-connect fluid couplings with check valves and sealing gaskets to prevent leakage. In use, when the detachable assembly is transported to the mobile support structure, both the battery charging operation and fluid refilling operation can begin automatically, without requiring manual connection by the operator. This integration reduces turnaround time and supports scalable UAV operations with minimal ground handling.

In some embodiments, safety interlock mechanisms 422 may be associated with the mobile support structure or the UAV airframe. The safety interlock mechanisms 422 may include mechanical position sensors, magnetic proximity sensors, or limit switches positioned to detect full engagement of the latching mechanism with the corresponding structure of the airframe. Upon verifying proper engagement, the safety interlock mechanisms 422 may transmit a control signal to the UAV flight controller, authorizing takeoff. In some examples, when the latching mechanism is not fully engaged, the interlock system may inhibit motor arming or flight initiation, thereby preventing unsafe operation. In some examples, the safety interlock system may also trigger indicator lights 424 or audible alarms 426 on the mobile support structure to provide immediate feedback to the operator regarding coupling status.

Figure 5B:
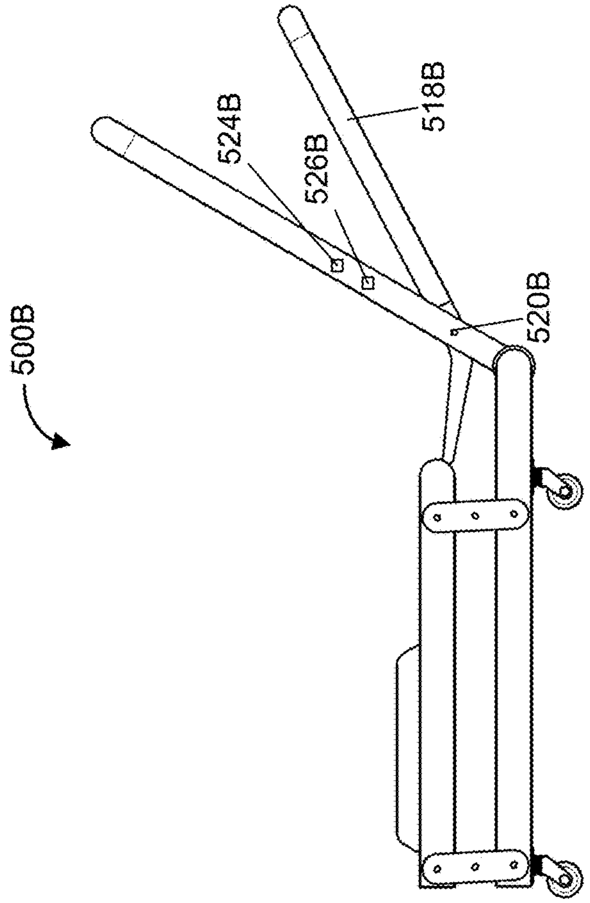
FIGS. 5A and 5B are schematic views of a mobile support structure, shown respectively in an unlifted position and a lifted position for facilitating engagement of the detachable assembly with the UAV.
Figure 5A:
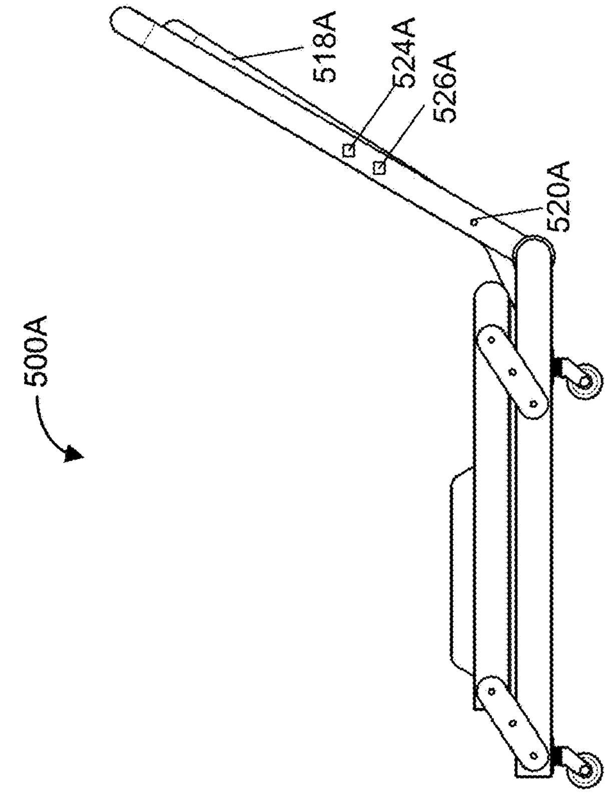

FIG. 5A is a side view of a mobile support structure 500A in an unlifted position, according to one or more embodiments of the present disclosure. The mobile support structure 500A includes a lever 518A shown in an upright position. In this configuration, the support structure remains at its baseline height, such that a detachable assembly may be placed onto or transported by the structure before engagement with a UAV airframe. The lever 518A is pivotally mounted about a pivot point 520A, which defines the rotational axis for raising and lowering a support platform of the mobile support structure 500A. The upright lever position represents the starting orientation prior to lifting. In some embodiments, the unlifted position may correspond to a parked or stationary state of the UAV servicing process, where the mobile support structure 500A is maintained at ground level before any coupling or engagement operation. In this state, the detachable assembly may rest securely on the mobile support structure 500A, allowing for safe transport, storage, or refilling prior to installation.

In some embodiments, the mobile support structure 500A may further include an indicator light 524A and an audible alarm 526A, as shown in FIG. 5A. The indicator light 524A may be mounted on the frame or handle of the support structure 500A and configured to provide visual feedback to an operator during the UAV servicing process. For example, the indicator light 524A may illuminate in different colors or flash patterns to indicate alignment status, engagement readiness, or error conditions. The audible alarm 526A may be configured to emit distinct tones or beeps corresponding to different operational states. For instance, a steady tone may indicate proper positioning of the detachable assembly, while intermittent beeps may indicate misalignment or incomplete engagement. These components may be electrically connected to the safety interlock system or position sensors to provide real-time feedback during the initial positioning stage when the mobile support structure is in the unlifted position.

FIG. 5B is a side view of a mobile support structure 500B in a lifted position, according to one or more embodiments of the present disclosure. The mobile support structure 500B includes a lever 518B shown in a lowered position. By rotating the lever 518B downward about a pivot point 520B, the support structure raises the detachable assembly at a controlled angle, thereby facilitating proper alignment with the rail structure of a UAV airframe. By rotating the lever downward, the support structure raises the detachable assembly at a controlled angle, thereby facilitating proper alignment with the rail structure of a UAV airframe. Once elevated, the coupling interface of the detachable assembly may engage with the complementary interface of the UAV. After use, the lever can be returned to the upright position to lower the assembly, disengage it from the UAV, and transport it back to a ground station for servicing. In some embodiments, the lifted position corresponds to an operating or working state of the UAV servicing process, in which the detachable assembly has been raised from its baseline position and aligned for engagement with the UAV airframe. Once in the lifted position, the coupling interface of the detachable assembly may be locked to the complementary interface of the UAV, thereby preparing the UAV for imminent flight operations. This position ensures that the detachable assembly is secured at the correct height and orientation relative to the UAV's center of gravity, which is critical for stable lift-off, flight balance, and controlled spraying operations.

The lifted position may also facilitate seamless transition from ground servicing to airborne operation, minimizing downtime by allowing the UAV to quickly depart once coupling is complete. In certain implementations, safety interlocks or position sensors may be provided to detect when the detachable assembly is fully elevated and secured, preventing the UAV from initiating flight until proper engagement is confirmed. Accordingly, the lifted position functions as the final preparatory state immediately preceding active UAV operation, and may be repeatedly cycled to enable rapid replacement, refueling, and redeployment of the UAV in agricultural or industrial environments.

Similarly, in some embodiments, the mobile support structure 500B may further include an indicator light 524B and an audible alarm 526B, as shown in FIG. 5B. The indicator light 524B may provide visual confirmation that the detachable assembly has reached the correct lifted position and is aligned for engagement with the UAV airframe. The audible alarm 526B may provide audible cues indicating successful elevation and alignment or warning signals if proper positioning has not been achieved. By providing both visual and audible feedback during the lifting operation, the mobile support structure enhances operator awareness and reduces the likelihood of improper coupling or unsafe operation during UAV servicing.

FIGS. 6A-6D illustrate a UAV including an airframe and a detachable assembly, according to one or more embodiments of the present disclosure. The detachable assembly integrates a fluid storage container and a battery into a single modular payload, which is secured to the underside of the airframe by a latching mechanism.

Figure 6A:
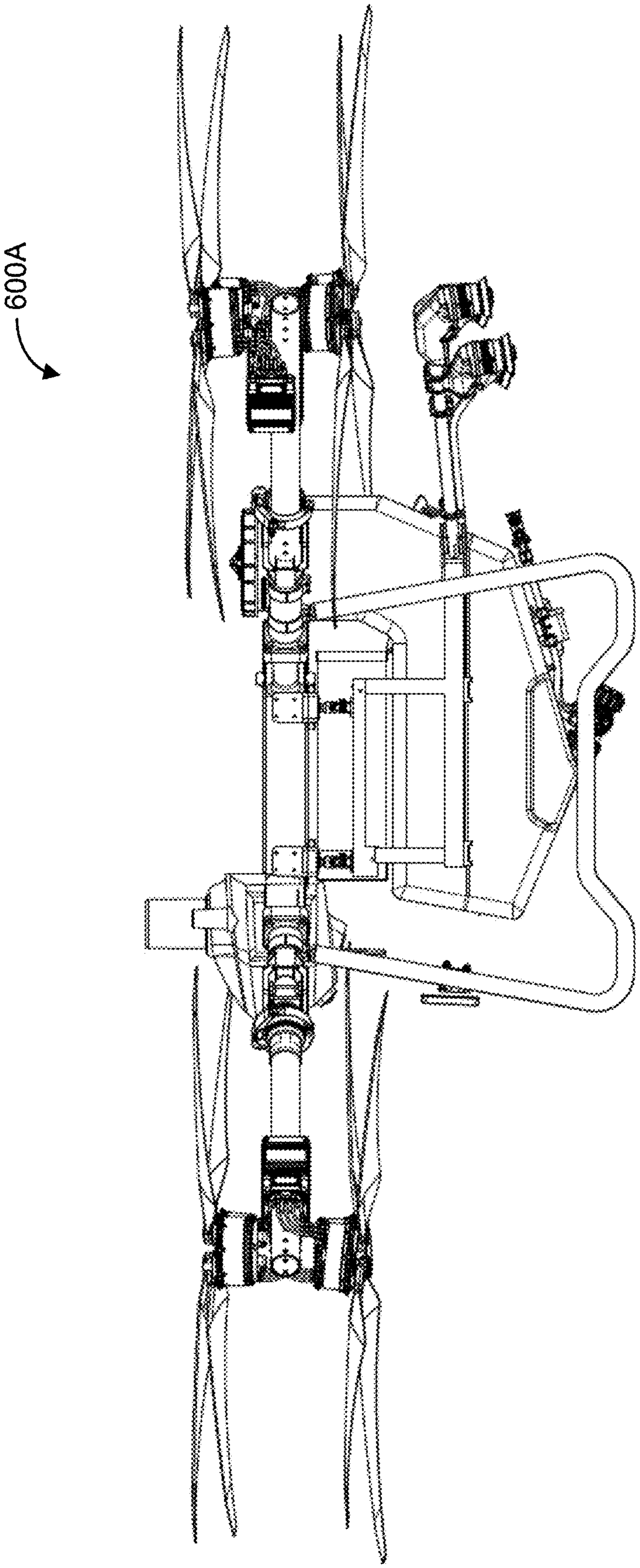
FIGS. 6A-6D are schematic views of a UAV including an airframe and a detachable assembly, according to one or more embodiments of the present disclosure.
Figure 6B:
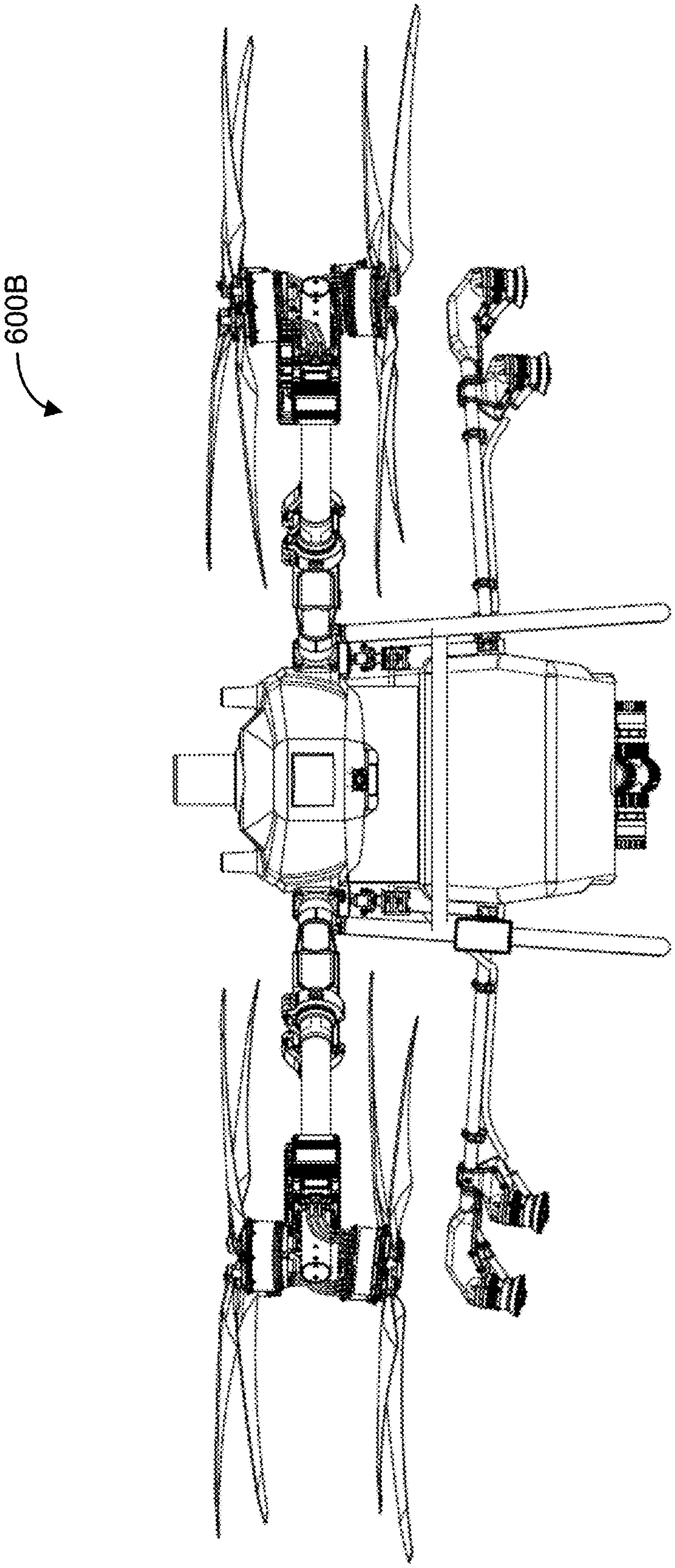
Figure 6C:
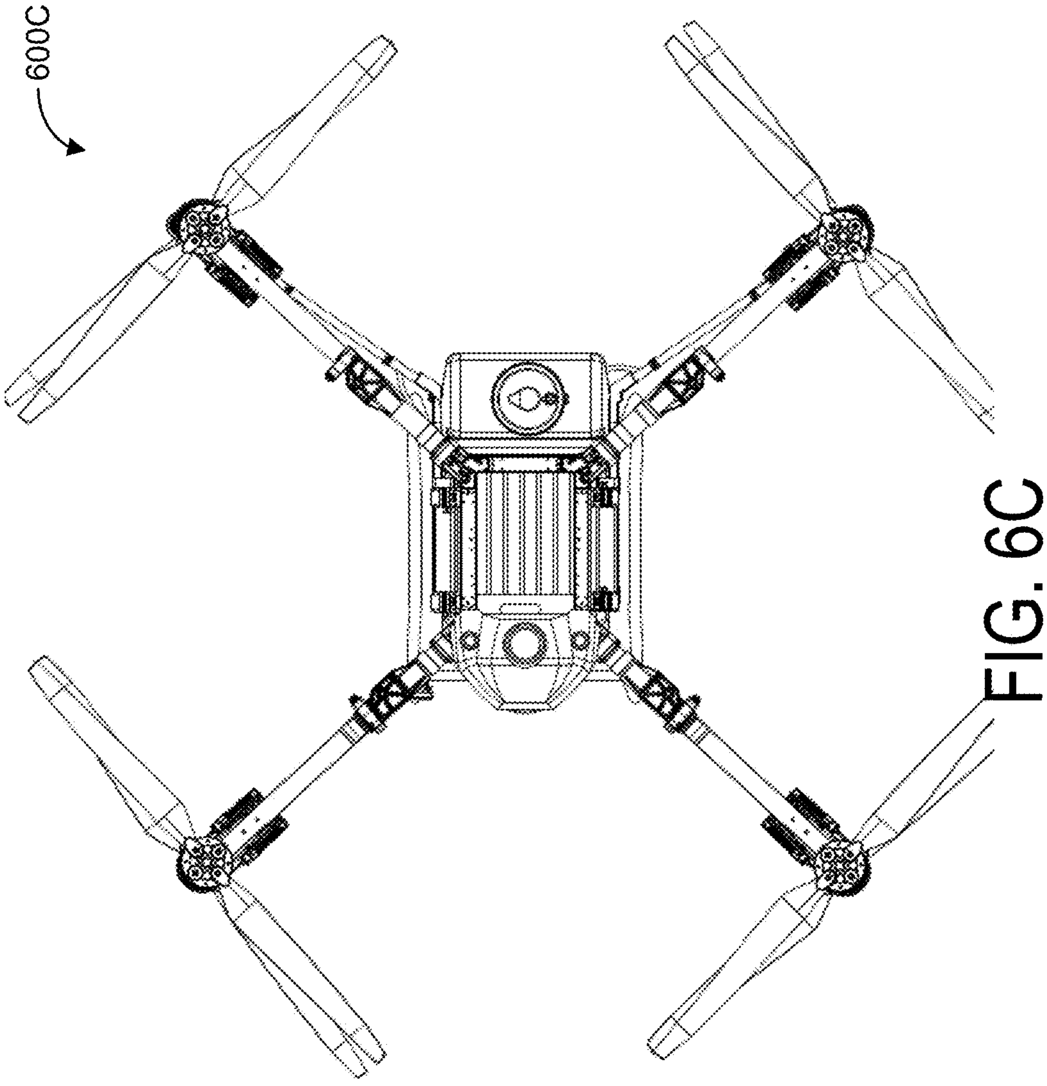
Figure 6D:
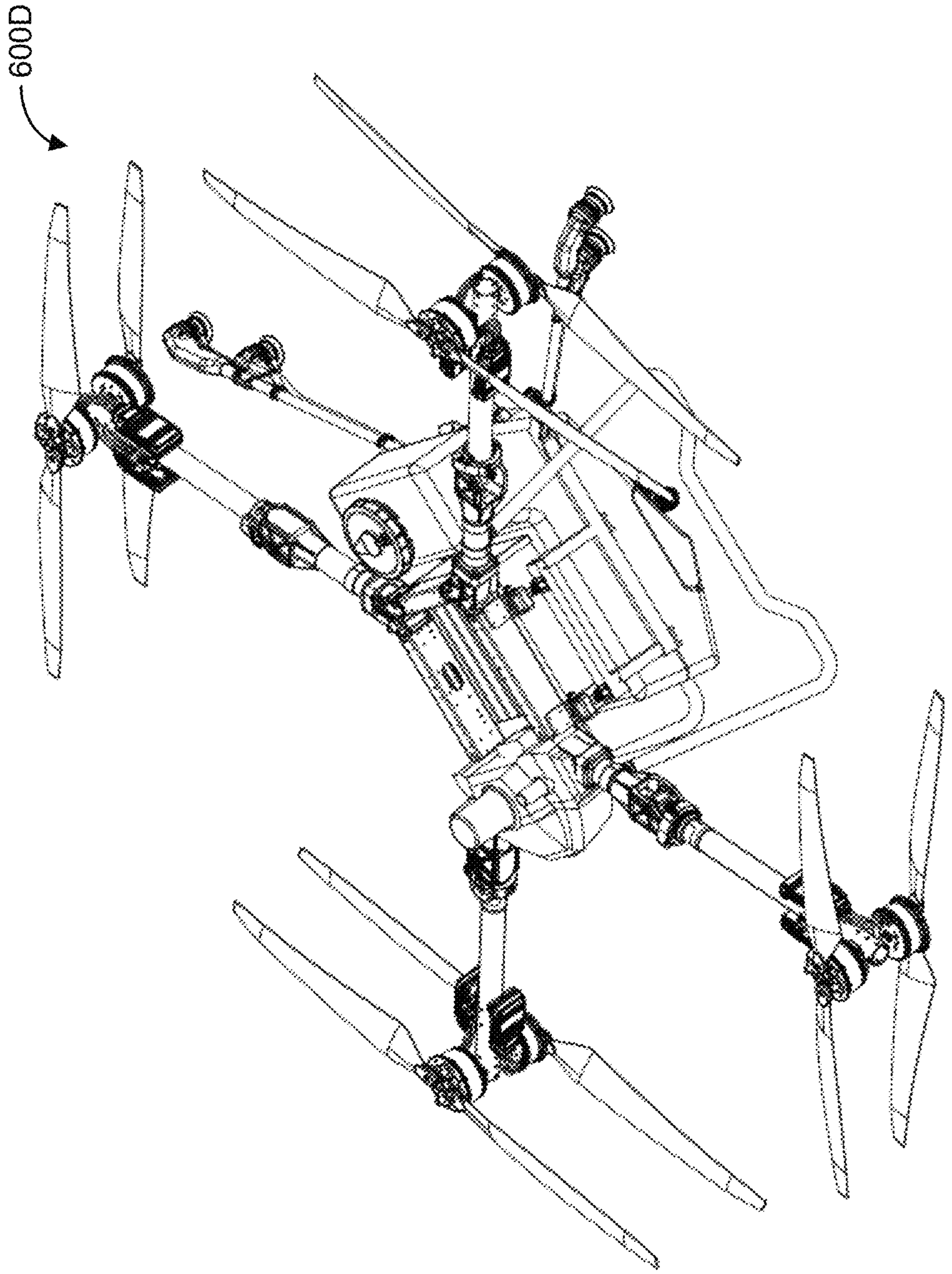

In FIG. 6A, a side view of UAV 600A is shown, illustrating the relative positioning of the detachable assembly beneath the airframe. FIG. 6B shows a front view of UAV 600B, showing the arrangement of the detachable assembly centered along the longitudinal axis of the airframe for balanced weight distribution. FIG. 6C provides a top view of UAV 600C, showing the quad-rotor configuration and the compact footprint of the detachable assembly relative to the UAV airframe. FIG. 6D is a perspective view of UAV 600D, further illustrating the integrated relationship between the detachable assembly and the airframe. In use, the detachable assembly can be rapidly coupled or removed from the UAV via a latching mechanism. By integrating both the fluid reservoir and battery into a single assembly, the UAV 600 achieves simplified servicing, reduced turnaround time, and improved operational efficiency for agricultural, industrial, and environmental applications.

FIGS. 7A-7D illustrate an airframe of a UAV, according to one or more embodiments of the present disclosure. The airframe defines a structural framework for receiving and securing a detachable assembly that integrates both a fluid reservoir and a battery. In the illustrated embodiments, the airframe is shaped to provide clearance beneath the rotor system, thereby allowing a modular payload to be mounted along the central longitudinal axis of the UAV.

Figure 7A:
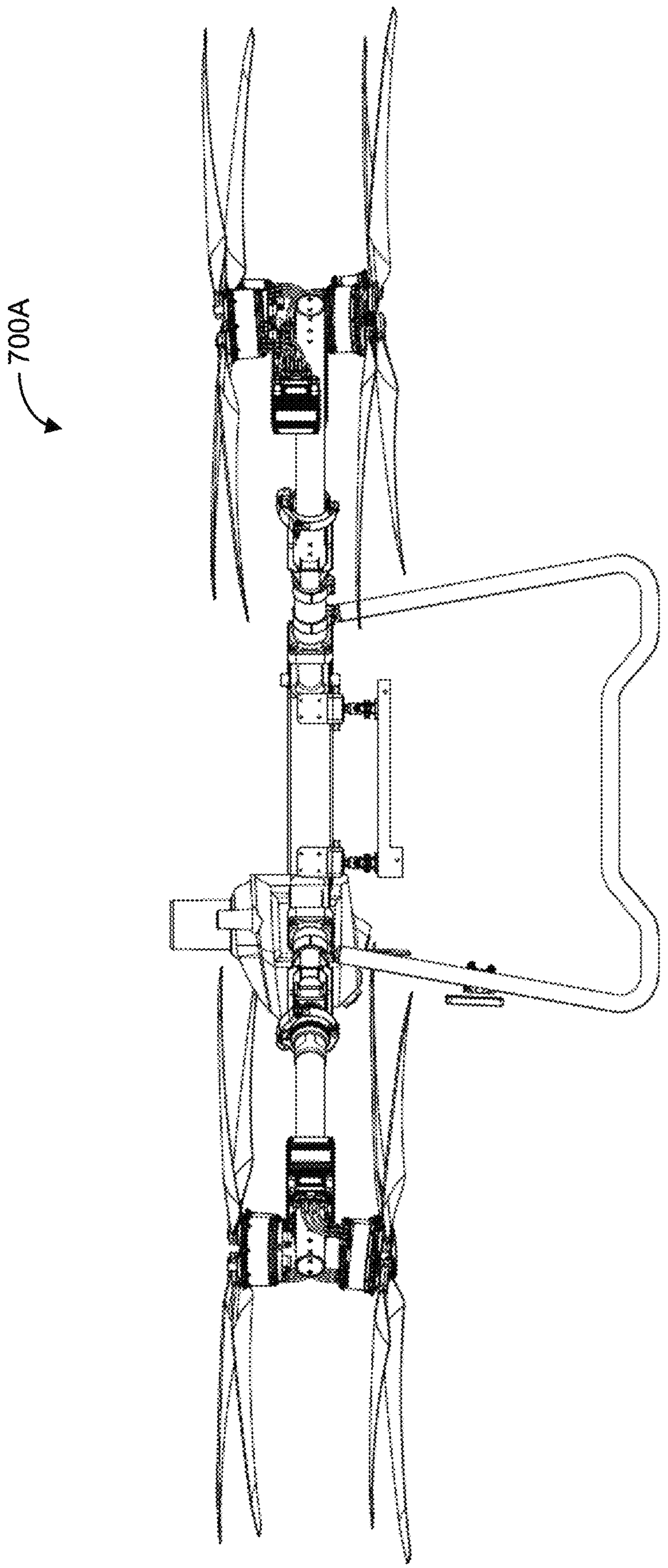
FIGS. 7A-7D are schematic views of an airframe of a UAV, according to one or more embodiments of the present disclosure.
Figure 7B:
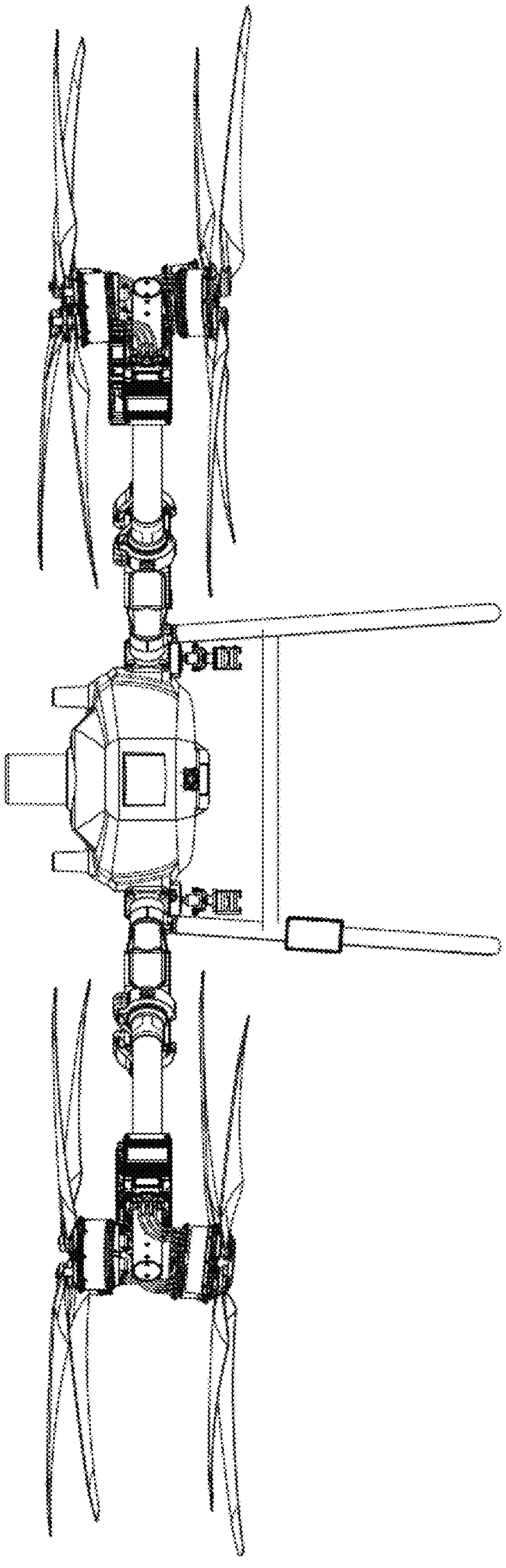
Figure 7C:
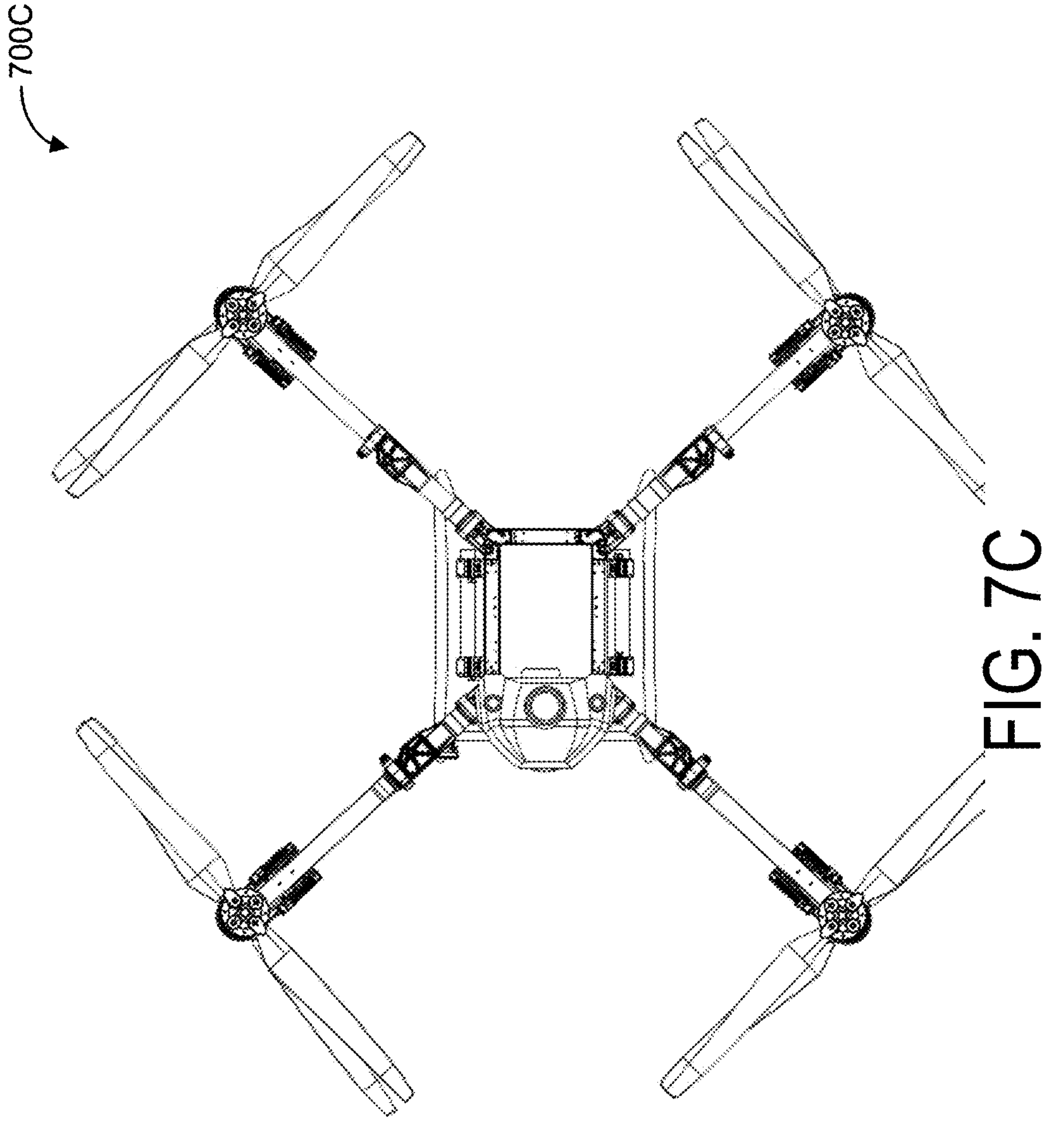
Figure 7D:
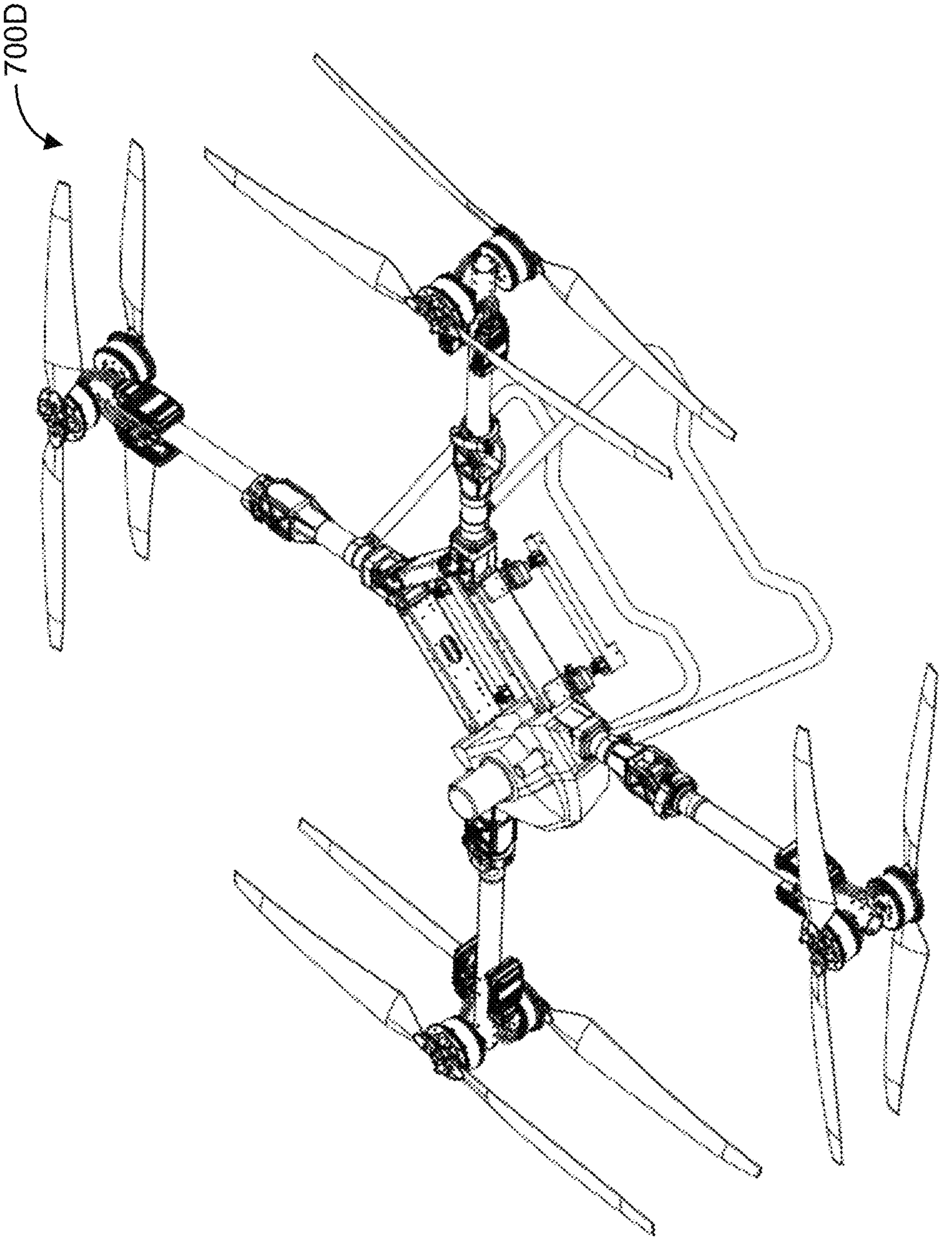

FIG. 7A illustrates a side view of airframe 700A, showing the relative position of the mounting region below the rotor arms. FIG. 7B illustrates a front view of airframe 700B, showing the symmetry of the rotor arrangement and the open space for receiving a detachable assembly between the landing supports. FIG. 7C provides a top view of airframe 700C, illustrating the quad-rotor layout positioned around the central frame. FIG. 7D is a perspective view of airframe 700D, further showing how the rotor arms, landing supports, and central frame cooperate to define a structural interface for a detachable assembly. In some embodiments, the airframes 700A-700D may include complementary interfaces, rail structures, or latching features for securing the detachable assembly. The airframes may also incorporate integrated wiring harnesses, fluid conduits, or sensor interfaces configured to operatively couple with the detachable assembly. By providing a robust and modular structure, the airframes 700A-700D enable rapid installation and removal of payloads, thereby improving turnaround efficiency and scalability of UAV operations in agricultural, industrial, and environmental applications.

FIGS. 8A-8D illustrate a mobile support structure configured to transport and position a detachable assembly that integrates a fluid storage container and a battery. The support structure includes a frame mounted on wheels for ground mobility, and a handle to allow an operator to push, pull, or steer the assembly during transport. The detachable assembly is secured to the support structure so that it may be safely moved between a ground station and an airframe of an UAV. In some embodiments, the mobile support structure further includes a charging port 808A-808D (shown respectively in FIGS. 8A-8D), which is positioned on the frame to align with a corresponding charging interface on the detachable assembly when the assembly is placed on the support structure. The charging port 808A-808D may include blind-mate electrical connectors or quick-connect couplings to enable automatic electrical connection for battery charging without manual cabling.

Figure 8A:
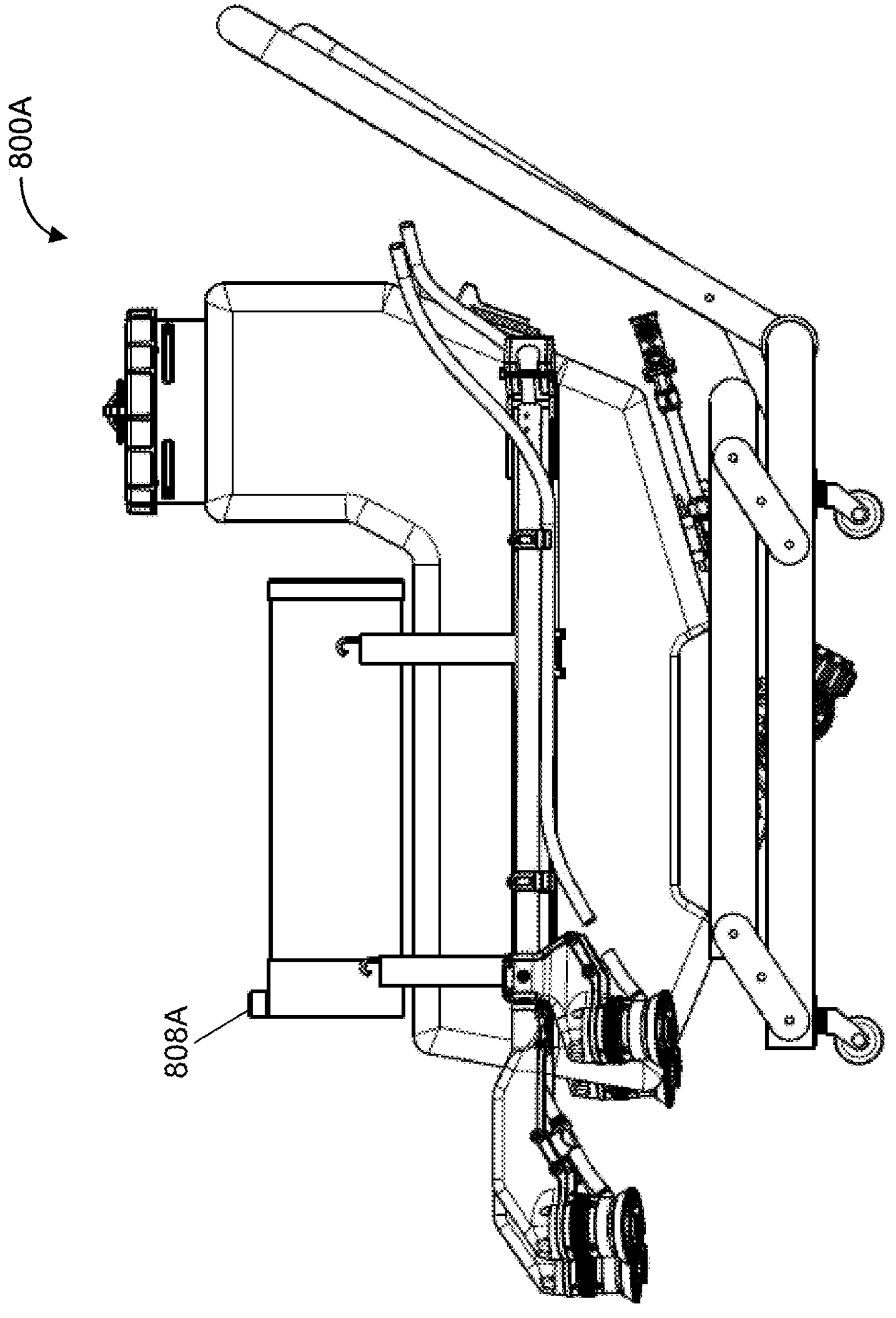
FIGS. 8A-8D are schematic views of a mobile support structure with a detachable assembly, according to one or more embodiments of the present disclosure.
Figure 8B:
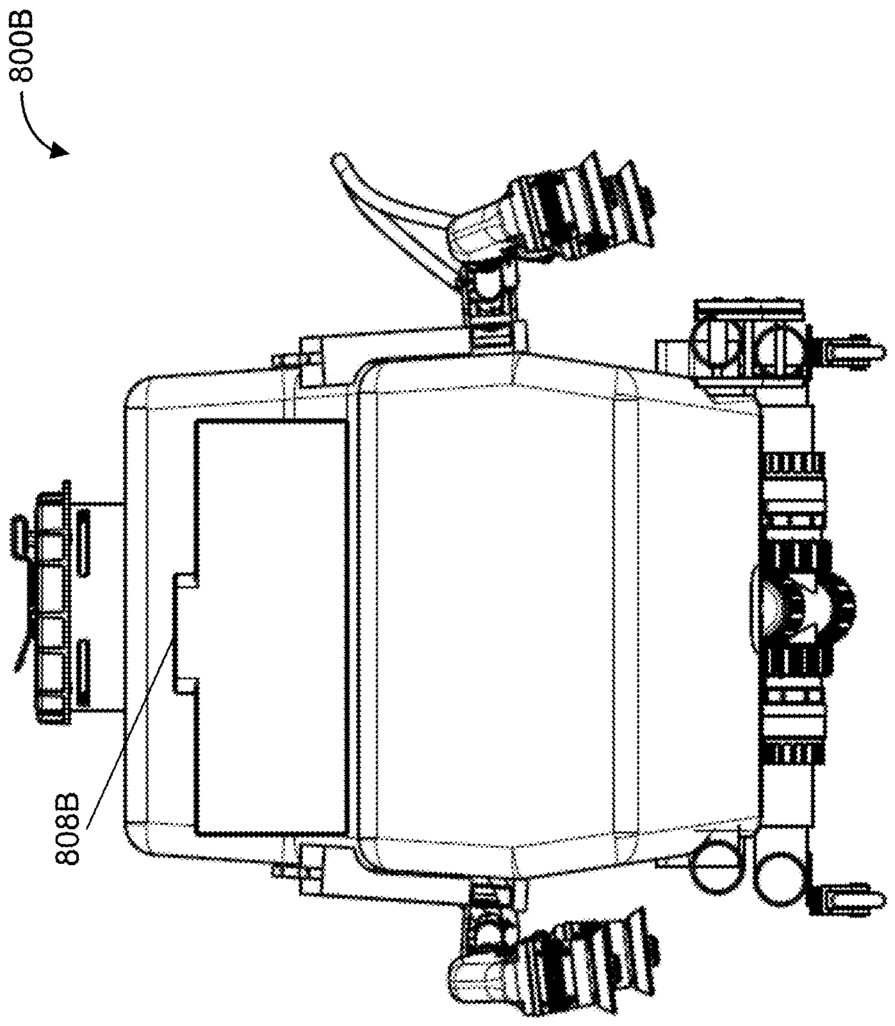
Figure 8C:
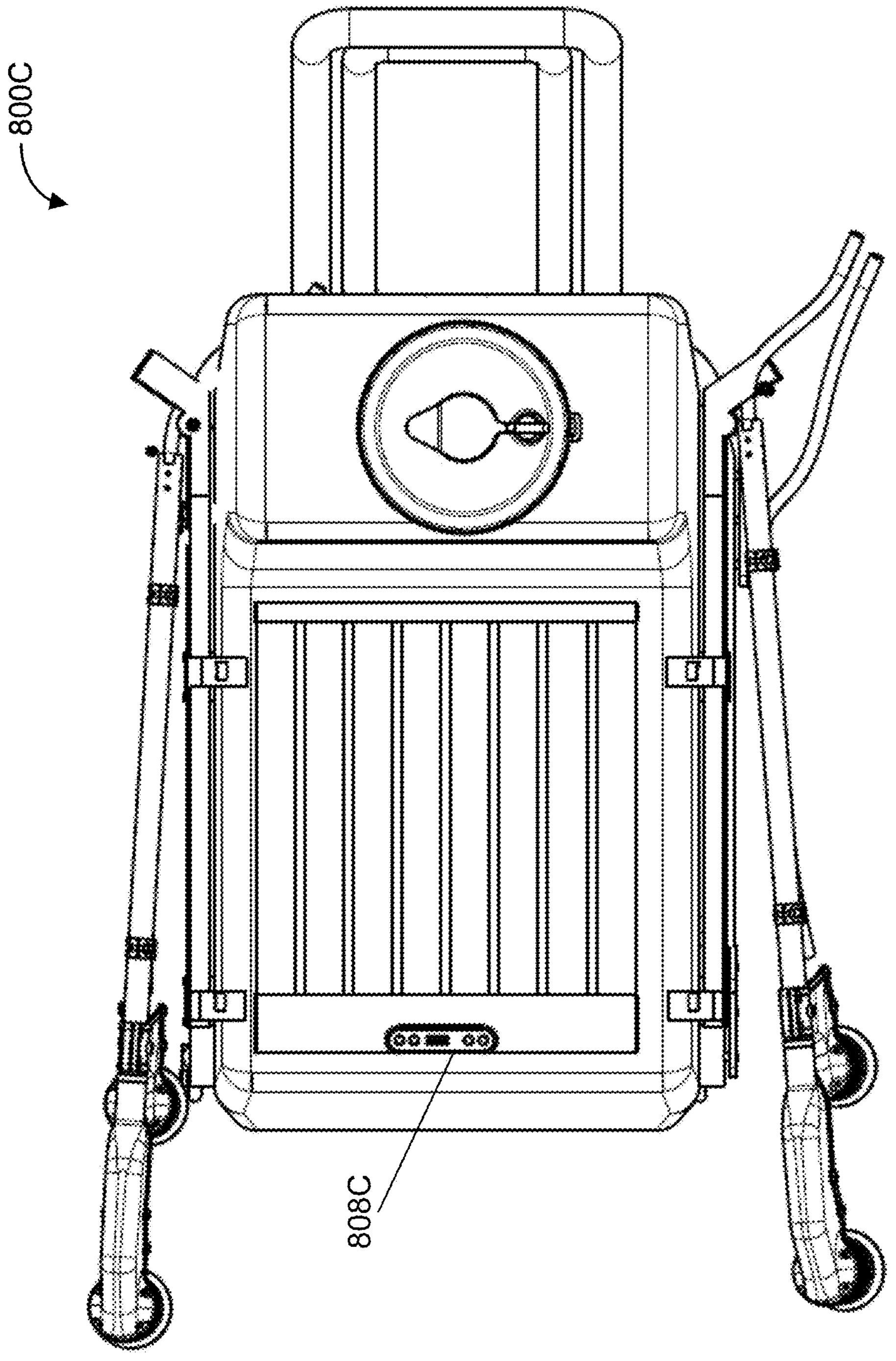
Figure 8D:
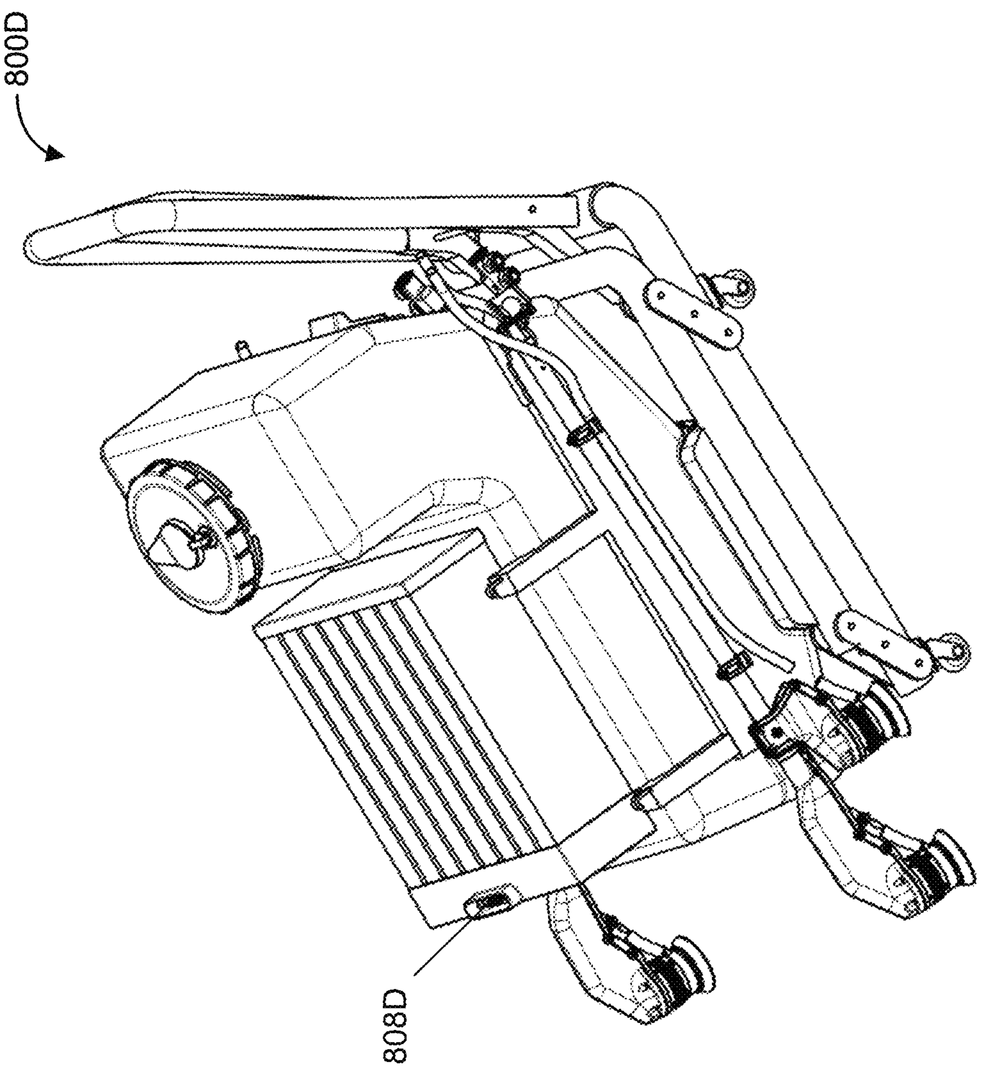

FIG. 8A shows the side view of mobile support structure 800A, illustrating how the detachable assembly rests securely within the frame of the support structure and how the charging port 808A is positioned for docking. FIG. 8B provides a front view of mobile support structure 800B, illustrating the orientation of charging port 808B relative to the assembly. FIG. 8C is a top view of the mobile support structure 800C, showing the placement of charging port 808C within the support frame. FIG. 8D is a perspective view of the mobile support structure 800D, illustrating the integrated relationship between the detachable assembly, the mobile support structure, and the charging port 808D. In some embodiments, the mobile support structure may further include a lever mechanism or lifting linkage configured to raise the detachable assembly to align with a UAV airframe for installation. The wheeled base may also incorporate locking features to stabilize the structure during coupling operations. By combining ground mobility with lifting capability, the mobile support structure reduces manual handling of heavy components, enhances operator safety, and enables rapid turnaround of UAV missions.

In one or more examples, the present disclosure provides a detachable assembly, including: a fluid storage container configured to store fluid to be sprayed using an unmanned aerial vehicle (UAV); a battery configured to provide power to the UAV, wherein the fluid storage container and the battery are affixed together to define the detachable assembly; and a latching mechanism affixed to the detachable assembly and configured to engage with a corresponding structure of the UAV to secure the detachable assembly to the UAV.

In some examples, the detachable assembly further include a charging port electrically coupled to the battery; and a filling port fluidly coupled to the fluid storage container, wherein the charging port and the filling port are configured to engage corresponding connectors of a ground station.

In some examples, the detachable assembly is configured to be guided along a rail structure into a coupling position, and the latching mechanism is configured to engage with and secure the detachable assembly to the UAV upon reaching the coupling position.

In some examples, the latching mechanism includes one or more latches configured to automatically lock the detachable assembly to the UAV upon engagement and to release the detachable assembly in response to manual actuation of the one or more latches.

In some examples, the battery includes a cooling interface configured to circulate a cooling fluid through a conduit during charging of the battery, the conduit being configured to receive the cooling fluid and to discharge the cooling fluid after charging.

In some examples, the detachable assembly further includes a spray assembly configured to dispense the fluid stored in the fluid storage container in response to a control signal.

In one or more examples, the present disclosure provides an unmanned aerial vehicle (UAV), comprising: a modular payload integrating: a fluid reservoir; a battery; and a coupling interface on the modular payload configured for releasable engagement with a complementary interface on the UAV.

In some examples, the UAV further includes an airframe including one or more lift structures, wherein the modular payload is configured to engage with the complementary interface on the airframe.

In some examples, the modular payload further includes a charging port electrically coupled to the battery; and a filling port fluidly coupled to the fluid reservoir, wherein the charging port and the filling port are configured to engage corresponding connectors of a ground station.

In some examples, the modular payload is configured to be guided along a rail structure into a coupling position, the coupling interface being configured to engage with and secure the modular payload with the complementary interface upon reaching the coupling position.

In some examples, the coupling interface includes one or more latches configured to automatically lock the modular payload to the UAV upon engagement and to release the modular payload in response to manual actuation of the one or more latches.

In some examples, the battery includes a cooling interface configured to circulate a cooling fluid through a conduit during charging of the battery, the conduit being configured to receive the cooling fluid and to discharge the cooling fluid after charging.

In some examples, the modular payload further includes a spray assembly configured to dispense the fluid stored in the fluid reservoir in response to a control signal.

In some examples, the airframe includes one or more of sensors, including a radar sensor, a flow sensor, and a weight sensor configured to measure a weight of the fluid reservoir.

In one or more examples, the present disclosure provides a system, including a detachable assembly including a fluid reservoir and a battery; and a latching mechanism affixed to the detachable assembly and configured to engage a corresponding structure of the system to secure the detachable assembly.

In some examples, the system further includes an airframe including one or more lift structures, wherein the detachable assembly is configured to engage with the corresponding structure of the airframe; and a mobile support structure configured to position the detachable assembly for engagement with the corresponding structure of the airframe.

In some examples, the mobile support structure includes a lever mechanism configured to lift the detachable assembly at an angle to facilitate engagement of the detachable assembly with the airframe, and further configured to secure the detachable assembly in place.

In some examples, the mobile support structure is further configured to disengage the detachable assembly from the airframe and transport the detachable assembly to a ground station for charging of the battery and refilling of the fluid reservoir.

In some examples, the mobile support structure further includes a power-assisted actuator configured to raise or lower the detachable assembly, the power-assisted actuator including at least one of a hydraulic cylinder, pneumatic cylinder, or electric motor.

In some examples, the system further includes a safety interlock system configured to detect full engagement of the latching mechanism with the corresponding structure of the airframe, and to generate a control signal to the UAV that enables takeoff upon verification of proper engagement.

The above are only some embodiments of the present disclosure, and neither the words nor the drawings can limit the protection scope of the present disclosure. Any equivalent structural transformation made by using the contents of the specification and the drawings of the present disclosure under the overall concept of the present disclosure, or directly/indirectly applied in other related technical fields are included in the protection scope of the present disclosure.

What is claimed is:

1. A detachable assembly, comprising:

a fluid storage container configured to store fluid to be sprayed using an unmanned aerial vehicle (UAV);

a battery configured to provide power to the UAV, wherein the fluid storage container and the battery are affixed together to define the detachable assembly; and a latching mechanism affixed to the detachable assembly and configured to engage with a corresponding structure of the UAV to secure the detachable assembly to the UAV, wherein the latching mechanism is configured to secure the detachable assembly to the UAV during flight.

2. The detachable assembly of claim 1, further comprising:

a charging port electrically coupled to the battery; and a filling port fluidly coupled to the fluid storage container, wherein the charging port and the filling port are configured to engage corresponding connectors of a ground station.

3. The detachable assembly of claim 1, wherein the detachable assembly is configured to be guided along a rail structure into a coupling position, and the latching mechanism is configured to engage with and secure the detachable assembly to the UAV upon reaching the coupling position.

4. The detachable assembly of claim 1, wherein the latching mechanism comprises one or more latches configured to automatically lock the detachable assembly to the UAV upon engagement and to release the detachable assembly in response to manual actuation of the one or more latches.

5. The detachable assembly of claim 1, wherein the battery comprises a cooling interface configured to circulate a cooling fluid through a conduit during charging of the battery, the conduit being configured to receive the cooling fluid and to discharge the cooling fluid after charging.

6. The detachable assembly of claim 1, further comprising a spray assembly configured to dispense the fluid stored in the fluid storage container in response to a control signal.

7. The detachable assembly of claim 1, wherein the battery is housed in a base coupled to the fluid storage container.

8. The detachable assembly of claim 1, wherein the detachable assembly comprises alignment guides configured to ensure proper alignment of the detachable assembly with the UAV.

9. The detachable assembly of claim 1, wherein the latching mechanism comprises one or more latches that are asymmetrically positioned such that the detachable assembly can only be installed to the UAV in a preset orientation.

10. An unmanned aerial vehicle (UAV), comprising:

a detachable assembly integrating:

a fluid reservoir, configured to store fluid to be sprayed using the UAV;

a battery, affixed to the fluid reservoir and configured to provide power to the UAV; and a coupling interface on the modular payload configured for releasable engagement with a complementary interface on the UAV;

wherein the coupling interface comprises:

a latching mechanism affixed to the detachable assembly and configured to engage with a corresponding structure of the UAV to secure the detachable assembly to the UAV, wherein the latching mechanism is configured to secure the detachable assembly to the UAV during flight.

11. The UAV of claim 10, wherein the UAV further comprises an airframe including one or more lift structures, wherein the modular payload is configured to engage with the complementary interface on the airframe.

12. The UAV of claim 10, wherein the detachable assembly further comprises:

a charging port electrically coupled to the battery; and a filling port fluidly coupled to the fluid reservoir, wherein the charging port and the filling port are configured to engage corresponding connectors of a ground station.

13. The UAV of claim 10, wherein the detachable assembly is configured to be guided along a rail structure into a coupling position, the coupling interface being configured to engage with and secure the detachable assembly with the complementary interface upon reaching the coupling position.

14. The UAV of claim 10, wherein the coupling interface comprises one or more latches configured to automatically lock the detachable assembly to the UAV upon engagement and to release the detachable assembly in response to manual actuation of the one or more latches.

15. A system, comprising:

a detachable assembly including a fluid reservoir and a battery; and a latching mechanism affixed to the detachable assembly; and an airframe including one or more lift structures, wherein the detachable assembly is configured to engage with a corresponding structure of the airframe to secure the detachable assembly, wherein the latching mechanism is configured to secure the detachable assembly to the airframe during flight.

16. The system of claim 15, further comprising:

a mobile support structure configured to position the detachable assembly for engagement with the corresponding structure of the airframe.

17. The system of claim 16, wherein the mobile support structure comprises a lever mechanism configured to lift the detachable assembly at an angle to facilitate engagement of the detachable assembly with the airframe, and further configured to secure the detachable assembly in place.

18. The system of claim 16, wherein the mobile support structure is further configured to disengage the detachable assembly from the airframe and transport the detachable assembly to a ground station for charging of the battery and refilling of the fluid reservoir.

19. The system of claim 18, wherein the mobile support structure further comprises a power-assisted actuator configured to raise or lower the detachable assembly, the power-assisted actuator including at least one of a hydraulic cylinder, pneumatic cylinder, or electric motor.

20. The system of claim 18, further comprising a safety interlock system configured to detect full engagement of the latching mechanism with the corresponding structure of the airframe, and to generate a control signal to the UAV that enables takeoff upon verification of proper engagement.

* * * * *